United States Patent [19]

Toyomura et al.

[11] Patent Number: 5,696,603
[45] Date of Patent: Dec. 9, 1997

[54] IMAGE FORMATION APPARATUS HAVING A GRADATION CONTROL UNIT

[75] Inventors: Yuuji Toyomura; Toshihiko Mitsuse, both of Fukuoka, Japan

[73] Assignee: Matsushita Electric Industrial Co., Ltd., Osaka, Japan

[21] Appl. No.: 220,615

[22] Filed: Mar. 31, 1994

[30] Foreign Application Priority Data

Jun. 23, 1993 [JP] Japan .................... 5-151845

[51] Int. Cl.$^6$ ........................................ H04N 1/40
[52] U.S. Cl. ........................ 358/458; 358/298; 358/459
[58] Field of Search ........................ 358/521, 458, 358/296, 298, 459; 399/180–181; 395/109, 102

[56] References Cited

U.S. PATENT DOCUMENTS 4,700,235 10/1987 Gall ............................ 358/298
5,386,305 1/1995 Usami .......................... 358/521
5,475,496 12/1995 Kumada ...................... 358/521
5,479,272 12/1995 Saito ........................... 358/521
5,579,451 11/1996 Suzuki ......................... 395/102

Primary Examiner—Edward L. Coles, Sr.
Assistant Examiner—Stephen Brinich
Attorney, Agent, or Firm—Spencer & Frank

[57] ABSTRACT

An image formation apparatus for conducting gradation recording by changing the size of dots on the basis of inputted image data, has a memory unit for storing a plurality of input image level-print output level characteristics for effecting gradation correction to the inputted image data, and a gradation correction unit for selecting different input image-print output level characteristics from the memory unit in each 1/n period of a transmission period of the inputted image data when n is a natural number of 2 or more, and determining the size of dots to be printed, in accordance with this output level. The apparatus can minimize the drop of resolution, can improve gradation, and can satisfy both gradation and resolution in good balance.

25 Claims, 20 Drawing Sheets

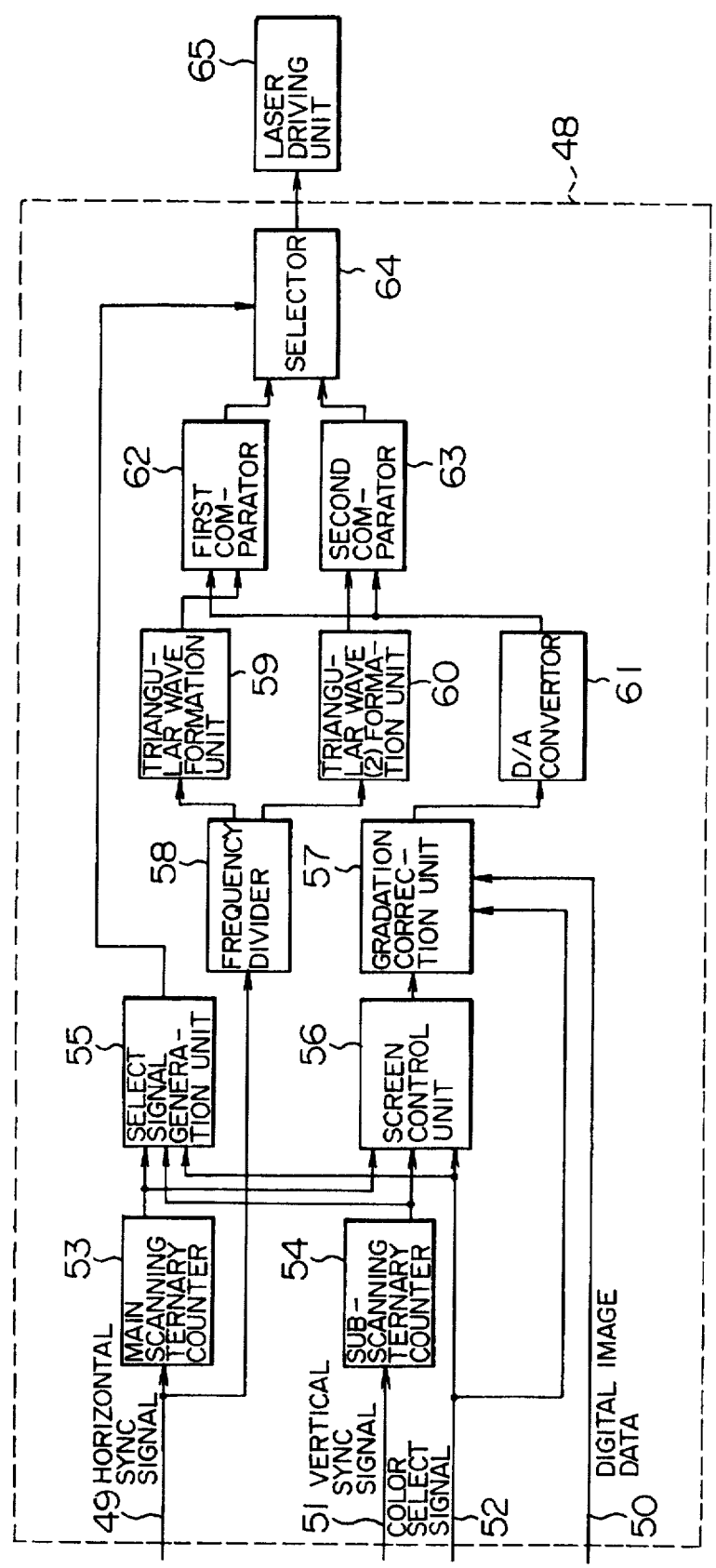

CONVERSION CHARACTERISTICS OF GRADATION CORRECTION TABLE a

CONVERSION CHARACTERISTICS OF GRADATION CORRECTION TABLE b

CONVERSION CHARACTERISTICS OF GRADATION CORRECTION TABLE c

CONVERSION CHARACTERISTICS OF GRADATION CORRECTION TABLE d

CONVERSION CHARACTERISTICS OF GRADATION CORRECTION TABLE e

CORVERSION CHARACTERISTICS OF GRADATION CORRECTION TABLE f

IMAGE FORMATION APPARATUS HAVING A GRADATION CONTROL UNIT

BACKGROUND OF THE INVENTION

This invention relates to an image formation apparatus for obtaining a high quality recording image.

Printers based on various principles have been proposed in the past as output terminals of personal computers, work stations, and so forth. Among them, laser beam printers employing an electrophotographic process in combination with laser technology, in particular, have become predominant because they have superior recording speed and printing quality.

On the other hand, there is a strong demand on the market for full coloration of the laser beam printer. Gradation reproducibility is one of the critical technical problems yet to be solved because there are 256 gradations for each color when the image data consists of 8 bits, for example, and about 16,700,000 colors are required for the combination of cyan, magenta and yellow.

FIG. 21 of the accompanying drawings shows schematically the construction of an image formation apparatus according to the prior art. Hereinafter, the construction and the operation of this conventional image formation apparatus will be explained with reference to FIG. 21. This explanation will be given primarily for an image formation apparatus of a so-called "intermediate transfer system". The image formation apparatus this system develops of an electrostatic latent image formed on a photosensitive member by a laser beam, etc., by a developing machine for each color, transfers once for each color a monochromatic image, which is converted to a visible image, to an image formation medium referred to as an "intermediate transfer member", synthesizes the monochromatic images, and collectively transfers the synthetic image on the intermediate transfer member to a recording sheet.

In FIG. 21, reference numeral 1 denotes a photosensitive member having a loop belt-like shape. The photosensitive member 1 is supported by three photosensitive member transfer rollers 2, 3 and 4, and is peripherally driven for rotation in a direction indicated by an arrow d1 by a motor, or the like. Reference numeral 5 denotes a photosensitive member position detection mark, and one mark is provided to an end portion of the photosensitive member 1. Reference numeral 6 denotes a photosensitive member position sensor for detecting the photosensitive member position mark 5. The photosensitive member 1 has a seam 7 and must avoid this seam 7 when forming an image. Therefore, it looks up the output of the photosensitive member position sensor 6.

A charger 8, an exposure optical system 9, developing machines 10K, 10Y, 10M, 10C for black (K), yellow (Y), Magenta (M) and cyan (C), respectively, a charge eliminator 11 before intermediate transfer, an intermediate transfer roller 12, a photosensitive member cleaning device 13 and a charge eliminator 14 are sequentially disposed around the photosensitive member 1 in the rotating direction indicated by the arrow d1. The charger 8 comprises a charging wire consisting of a tungsten wire, etc., a shield plate consisting of a metallic plate, a grid plate, etc. When a negative high voltage is applied to the charging wire, the charging wire causes corona discharge. When a negative voltage of −700 V is applied to the grid plate, for example, the surface of the photosensitive member is uniformly charged to a negative potential of about −700 V.

The exposure optical system 9 comprises a laser driving device, a laser diode, a polygonal mirror, a lens system, a polygonal mirror driving motor (scanner motor), etc., exposes the charged photosensitive member 1 and forms an electrostatic latent image. Reference numeral 15 denotes exposure beams 15 irradiated from the exposure optical system 9. The exposure beams 15 are obtained by driving the laser diode constituting the exposure optical system 9 by a pulse width modulation output in accordance with image data, and form an electrostatic latent image corresponding to the image data of a specific color on the photosensitive member 1.

The developing machines 10K, 10Y, 10M, 10C for the respective colors store the black, yellow, Magenta and cyan toners, respectively. Each of them has a sleeve roller 16K, 16Y, 16M, 16C using an electrically conductive rubber, etc. When each sleeve roller 16K, 16Y, 16M, 16C is rotated in a normal direction with respect to the rotating direction (the direction indicated by the arrow d1) of the photosensitive member 1, each toner is supplied in a thin layer form to the surface of the sleeve roller 16K, 16Y, 16M, 16C from the corresponding developing machine 10K, 10Y, 10M, 10C. The toner is charged to negative at the point when it is converted to the thin layer form. Development of each color is effected by applying a negative voltage (developing bias) to each sleeve roller 16K, 16Y, 16M, 16C, driving an exclusive motor (not shown in the drawing) corresponding to a detachable cam 17K, 17Y, 17M, 17C of each color while rotating each sleeve roller 16K, 16Y, 16M, 16C, moving a selected developing machine 10K of black, for example, in a direction indicated by an arrow d3, and bringing the sleeve roller 16K into contact with the photosensitive member 1. In other words, this prior art example employs contact development using non-magnetic single component toners.

The surface potential (bright potential) of the portion of the photosensitive member 1 at which the latent image is formed rises to a value from about −50 to about −100 V. When a negative potential of about −300 V is applied to each sleeve roller 16K, 16Y, 16M, 16C, an electric field develops from the photosensitive member 1 towards the sleeve roller 16K, 16Y, 16M, 16C. As a result, the Coulomb force acts on the negatively charged toner on the sleeve roller 16K, 16Y, 16M, 16C in the opposite direction to the electric field, that is, in the direction of the photosensitive member 1, and the toner adheres to the latent image portion formed on the photosensitive member 1. On the other hand, the surface potential (dark potential) at the portions of the photosensitive member 1 at which the latent image is not formed is about −700 V. Therefore, even when the developing bias is applied, the electric field develops from the sleeve roller 16K, 16Y, 16M, 16C towards the photosensitive member 1, so that the toner does not adhere to the photosensitive member 1. Since the toner is allowed to adhere (black) to the portion (white) to which the rays are not irradiated, such a development process is generally referred to as a "negative-positive process" or "reversal development".

The charge eliminator 11 before intermediate transfer is constituted by disposing a plurality of red LEDs on a line, and eliminates the charge of the photosensitive member 1 immediately before the toner image formed on the photosensitive member 1 is transferred to the intermediate transfer member 18 as a synthesizing medium of each color image. This charge elimination before transfer provides the effect that when the toner image is transferred to the intermediate transfer member 18 and when no toner exists on the photosensitive member 1, the toner image of the intermediate transfer member 18 is prevented from being reversely transferred to the photosensitive member 1.

Next, the intermediate transfer roller 12 is a metal roller which exists in the vicinity of the photosensitive member transfer roller 3 and comes into contact With the inside of the intermediate transfer member 18. This roller 12 is so disposed as to oppose the photosensitive member 1 while interposing the intermediate transfer member 18 between them. Here, a part of the layer forming the photosensitive member 1 is grounded. Therefore, when a positive voltage is applied to the intermediate transfer roller 12, the electric field develops from the intermediate transfer roller 12 towards the photosensitive member 1. Therefore, the Coulomb force acts on the negatively charged toner on the photosensitive member 1 in the direction of the intermediate transfer member 18, and the toner is transferred to the intermediate transfer member 18.

The photosensitive member cleaning device 13 is disposed in such a manner as to oppose the photosensitive member transfer roller 4 while interposing the photosensitive member 1 between them, and removes any residual toner remaining on the photosensitive member 1 after the transfer of the toner from the photosensitive member 1 to the intermediate transfer member 18. The charge eliminator 14 is constituted by disposing a plurality of red LEDs on a line, and eliminates the residual potential on the photosensitive member 1.

The intermediate transfer member 18 is a loop-like belt made of an electrically conductive resin but devoid of a seam, and is a medium for forming a full color image by synthesizing the monochromatic images. The intermediate transfer member 18 is supported by three transfer rollers 19, 20, 21 and is peripherally rotated in the direction of the arrow d2 by the same driving motor as that of the photosensitive member 1. Reference numeral 22 denotes an intermediate transfer member position detection mark, and eight marks are disposed at an edge portion of the intermediate transfer member 18. Reference numeral 23 denotes an intermediate transfer member position detection sensor for detecting the intermediate transfer member position detection marks 22. When an image is formed, one mark is selected from a plurality of intermediate transfer member position detection marks 22, and is used as the reference position for forming the image on the intermediate transfer member 18.

A charger 24 before transfer, a density sensor 25, a sheet transfer roller 26 and an intermediate transfer member cleaning device 27 are disposed around the intermediate transfer member 18 in the rotating direction indicated by the arrow d2.

The charger 24 before transfer is a corotron charger comprising a charging wire consisting of a tungsten wire, etc., and a shield plate consisting of a metallic plate. When a negative high voltage is applied to the charging wire, the charging wire causes corona discharge and compulsively re-charges the toner image synthesized on the intermediate transfer member 18. This charger 24 before transfer is activated only for the toner image region on the intermediate transfer member 18 immediately before transfer to recording paper 28, and is at halt at other times. Due to this charging before transfer, mechanical margin and environmental resistance characteristics at the time of transfer to recording paper 28 can be improved drastically.

The density sensor 25 has a reflection type sensor, and detects the toner concentration on the intermediate transfer member 18. The sheet transfer roller 26 comprises a center shaft made of a metal and a foamed silicone or a conductive urethane rubber covering the center shaft, and rotates while keeping contact with the intermediate transfer member 18 when the toner image synthesized on the intermediate transfer member 18 is transferred to recording paper 28. When this sheet transfer roller 26 is contaminated by the toner, etc., the image gets deteriorated. Therefore, the cleaning device is generally disposed in the vicinity of this roller 26.

The intermediate transfer member cleaning device 27 removes the residual toner on the intermediate transfer member 18 after the transfer of paper, is kept apart from the intermediate transfer member 18 while the toner image is synthesized on the intermediate transfer member 18, and comes into contact therewith only at the time of cleaning.

Reference numeral 28 denotes recording paper, which is the final transfer medium of the toner image formed on the intermediate transfer member 18. Reference numeral 29 denotes a recording paper cassette, which stores recording paper 28. A paper feed roller 30 is a semicircular roller, which feeds recording paper 28 one by one from the recording paper cassette 29 to a paper transfer path 31. A slip roller 32 is disposed at an intermediate part of this paper transfer path 31 and recording paper 28 picked up by the paper feed roller 30 is transferred by the slip roller 32 to a resist roller 33a. This resist roller 33a does not rotate at the point of time when the distal end of recording paper 28 reaches the resist roller 33a, and recording paper 28 cannot advance any more but slips at the position of the slip roller 32. The resist roller 33a and a follower roller 33b temporarily keep recording paper 28 halted so as to bring recording paper 28 into coincidence with the position of the synthesized image on the intermediate transfer member 18. During the operation, they rotate with each other and transfer recording paper 28 in the direction of the paper transfer roller 26.

A fixing device 34 comprises a heat roller 35, a press roller 36, a temperature sensor, and the like. Among them, the heat roller 35 comprises a heater, a core made of aluminum and silicone rubber having a thickness of about 0.5 mm, heats the surface of the toner image transferred to recording paper 28, and softens and fuses the toner. The press roller 36 comprises a shaft made of iron and silicone rubber having a thickness of about 3 mm, clamps recording paper 28 in cooperation with the heat roller 35 and applies pressure to this recording paper 28. With the rotation of the heat roller 35 and the press roller 36 while clamping recording paper 28 between them, the toner image on recording paper 28 is fixed to recording paper 28 by heat and pressure. The temperature sensor 37 is a sensor such as a thermistor and detects the temperature of the surface of the heat roller 35. The output of this temperature sensor 37 is detected in a suitable cycle, and a turn-on time of the heater per unit time is controlled so that the heat roller 35 keeps always a predetermined temperature.

Next, a gradation reproduction method in the conventional image formation apparatus will be explained with reference to FIG. 22. This drawing is a conceptual view of the gradation reproduction method in the image formation apparatus according to the prior art. In FIG. 22, reference numeral 38 denotes an image signal, which is obtained by converting a digital image signal transferred from outside the image formation apparatus to an analog level signal, for example. Reference numeral 39 denotes an image clock, and, the image signal 38 is transmitted in synchronism with this image clock 39. Reference numeral 40 denotes a pattern signal, which is obtained by processing the image clock 39 by an integrator, etc. When a rectangular wave having a duty ratio of 50% is used as the image clock 39, a triangular wave can be obtained as the pattern signal 40.

Here, the image signal 38 and the pattern signal 40 are compared with each other using a comparator. When the comparator is so arranged as to output a Hi level (e.g. 5 V) when the level of the image signal 38 exceeds the level of the pattern signal 40, the image signal 38 can be converted to a pulse width modulation signal 41.

The turn-on time of the laser constituting the exposure optical system 9 is controlled by the use of this pulse width modulation signal 41, and the photosensitive member 1 is exposed. In this way, a dot image 42 is formed on the photosensitive member 1 and the area of the latent image changes in accordance with the pulse width. Accordingly, gradation reproduction is possible, in principle.

According to the prior art, however, the maximum level of the image signal 38 is limited in most cases to a level from about 60 to about 80% of the maximum level of the pattern signal 40 in order to mitigate degradation of the gradation property in the high density region of the output image (because the output image density gets into saturation when the maximum level of the image signal 38 is about 70% of the maximum level). Whether or not this gradation reproducibility is acceptable is greatly affected by the dynamic ranges of the minimum recording dots (the dots having the smallest reproducible size) and the maximum recording dots (the dots having the greatest reproducible size). When gradation is controlled area-wise using pulse width modulation, it can be said that the greater the pulse width providing the minimum recording dots and the greater the pulse width providing the maximum reproducible dots, the greater advantage can be obtained for gradation reproduction. In the case of the example shown in FIG. 22, however, the practical dynamic range is about 70% of the cycle of the pattern signal 40 because the maximum level of the image signal 38 is limited, and gradation reproduction is substantially difficult in many cases.

Accordingly, an image formation apparatus applying the electrophotographic process employs in many cases the following method. FIG. 23 is a conceptual view of a gradation reproduction method which sets importance on the gradation characteristics of the image formation apparatus according to the prior art. In comparison with the pattern signal 40 shown in FIG. 22, the cycle of the pattern signal 43 is set to be double. The pattern signal 43 can be obtained by processing a ½ frequency division output of the image clock 39 by an integrator, etc. On the other hand, the image signal 38 is transmitted in synchronism with the image block 39. In other words, the cycle of the pattern signal 43 is twice that of the image signal 38. The image signal 38 and pattern signal 43 are compared with each other using a comparator. If the comparator is so arranged as to output a Hi level (e.g. 5 V) when the level of the image signal 38 exceeds that of the pattern signal 43, the image signal 38 can be converted to the pulse width modulation signal 46. The turn-on time of the laser constituting the exposure optical system 9 is controlled by the use of this pulse width modulation signal 46, for example, and the photosensitive member 1 is exposed. Since the area of the latent image changes in accordance with the pulse width, the dot image 47 can thus be formed on the photosensitive member 1.

As described above, the pulse width of the pulse width modulation signal 46 can be continuously controlled to the maximum two-pixel width. In this case, the pulse width providing the minimum recording dot remains the same as that of FIG. 22, but the dynamic range of the controllable pulse width can be expanded to about twice because the maximum recording dot in FIG. 23 comprises two pixels. For this reason, the amount of change of the pulse width becomes greater and the gradation characteristics can be improved.

Recently, a method of improving the gradation characteristics by setting the cycle of the pattern signal 40 to three times that of FIG. 22 has been put into practical application. In any event, however, the maximum pulse width or in other words, the maximum value of the dot, can be set to only some multiple of the cycle of the pattern signal 40.

As described above, the method which expands the dynamic range of the pulse width modulation signal 41 can improve the gradation characteristics. However, in the image formation apparatus applying laser modulation to the gradation reproduction method, the gradation characteristics and resolution have a trade-off relationship. When priority is given to the gradation characteristics in the conventional construction, resolution drops by at least ½ because a plurality of pixels are altogether converted to the pulse width. Accordingly, when a natural picture and fine computer graphics exist in a mixture in an image to be recorded, for example, there occurs the problem that when the gradation characteristics of the natural picture are improved, the images collapse.

SUMMARY OF THE INVENTION

It is therefore a main object of the present invention to provide a high quality image formation apparatus which can satisfy gradation and resolution in good balance.

According to an aspect of the present invention, there is provided an image formation apparatus which comprises a memory unit for storing a plurality of input image level-print output level characteristics for applying gradation correction to an inputted image data, and a gradation correction unit for selecting different input image level-print output level characteristics from the memory unit in each 1/n period of the transmission period the inputted image data when n is a natural number of 2 or more, determining the level of the inputted image data in accordance with the selected characteristics, and determining the size of dots to be printed in accordance with the output level.

According to this image formation, the maximum value of the size of the dots, that is, resolution, can be finely set by the number of selection of the input image level-print output levels and the selected period.

BRIEF DESCRIPTION OF THE DRAWINGS

FIG. 1 is a block diagram of a gradation control unit of an image formation apparatus according to the first embodiment of the present invention;

DESCRIPTION OF THE PREFERRED EMBODIMENTS (Embodiment 1)

Hereinafter, the first embodiment of the present invention will be described with reference to the drawings.

Figure 2A:
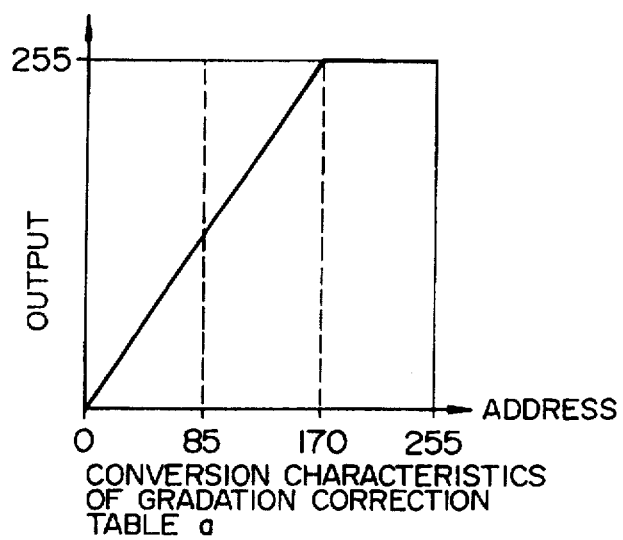
FIG. 2A shows a gradation correction table of the gradation control unit of the image formation apparatus according to the first embodiment.
Figure 2B:
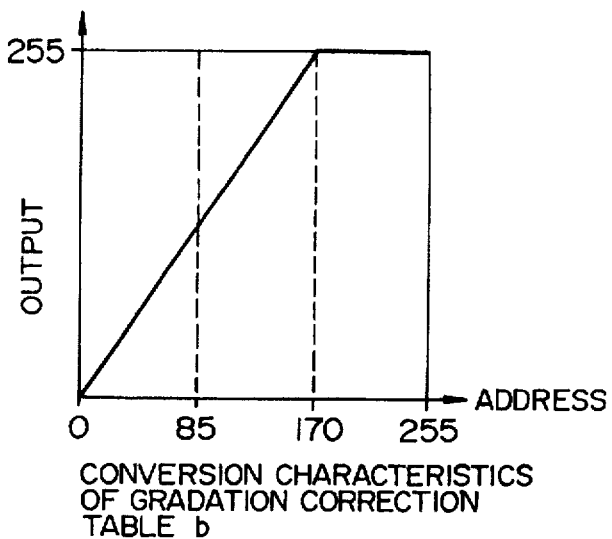
FIG. 2B shows the gradation correction table of the gradation control unit of the image formation apparatus according to the first embodiment.
Figure 2C:
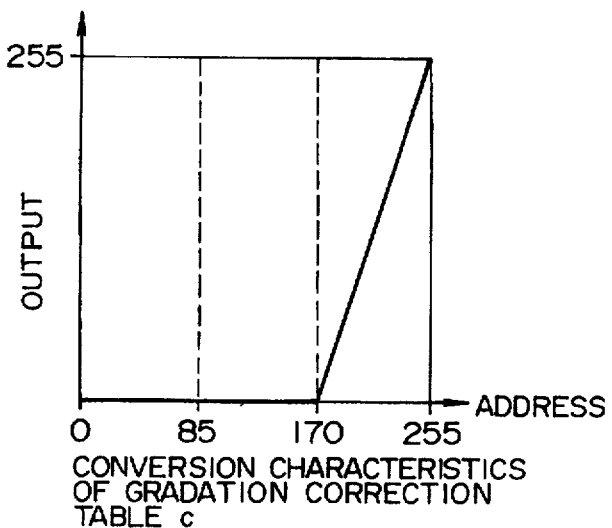
FIG. 2C shows the gradation correction table of the gradation control unit of the image formation apparatus according to the first embodiment.

FIG. 1 is a block diagram of a gradation control unit of an image formation apparatus according to the first embodiment of the present invention, and FIGS. 2A, 2B and 2C show gradation correction tables of the image formation apparatus in the first embodiment of the present invention. In FIG. 1, reference numeral 48 denotes a gradation control unit of this image formation apparatus; 49 is a horizontal sync (synchronization) signal sent from outside to this gradation control unit 48 in a ½ pixel period; 50 is digital image data sent from outside to the gradation control unit 48 in synchronism with a ½ frequency division signal of the horizontal sync signal 49; 51 is a vertical sync signal which is sent whenever exposure beams effect scanning for one line by an exposure optical system of the image formation apparatus; 52 is a color select signal specifying whether the digital image data 50 inputted to the gradation control unit 48 represents cyan, magenta, yellow or black; 53 is a main scanning ternary counter which effects counting whenever the horizontal sync signal 49 is inputted; and 54 is a sub-scanning ternary counter which effects counting whenever the vertical sync signal 51 is inputted.

Reference numeral 55 denotes a select signal generation unit which inputs the main scanning ternary counter 53, the sub-scanning ternary counter 54 and the color select signal 52, and outputs a select signal representing which of a first comparator 62 and a second comparator 63 a selector 64 is to select. Reference numeral 56 denotes a screen control unit which inputs the main scanning ternary counter 53, the sub-scanning ternary counter 54 and the color select signal 52, and outputs a signal necessary for selecting the gradation correction tables. Reference numeral 57 denotes a gradation correction unit which gains access to a look-up table (LUT) for correcting the gradation characteristics of the image formation apparatus and corrects non-linear characteristics of the image formation apparatus. Reference numeral 58 denotes a frequency divider which divides the frequency of the horizontal sync signal 49. Reference numeral 59 denotes a triangular wave (1) formation unit which converts as such the output of the frequency divider 58 to an analog pattern signal using an integration circuit, and reference numeral 60 denotes a triangular wave (2) formation unit which reverses the output of the frequency divider 58 and then converts it to an analog pattern signal using the integration circuit. Reference numeral 61 denotes a D/A convertor which converts the digital image data after gradation correction, which is outputted from the gradation correction unit 57, to an analog level signal. Reference numeral 62 denotes a first comparator which compares the output of the triangular wave (1) formation unit 59 with the output of the D/A convertor 61 and converts it to a pulse width, and reference numeral 63 denotes a second comparator which compares the output of the triangular wave (2) formation unit 60 with the output of the D/A convertor 61 and converts it to a pulse width. Reference numeral 64 denotes a selector which selects the outputs of the first and second comparators 62 and 63 in accordance with the output of the select signal generation unit 55. Reference numeral 65 denotes a laser driving unit, which controls ON/OFF of laser diodes that constitute the exposure optical system of the image formation apparatus on the basis of the pulse width conversion output of the selector 64.

Next, the construction of the gradation control unit 57 will be explained with reference to FIGS. 2A, 2B and 2C. The gradation correction unit 57 has three 256-byte tables for each color using look-up tables (LUT) constituted by SRAMs, etc., makes access to the corresponding address in accordance with the color select signal 52, the output of the screen control unit 56 and the digital image data 50, and outputs the data stored there. In the description that follows, these gradation correction tables will be referred to as "gradation correction tables a, b and c", respectively.

In practical image formation apparatuses, these gradation correction tables a to c are set in many cases to non-linear tables in order to linearly correct the gradation characteristics of the apparatuses. To simplify the explanation, however, it will be hereby assumed that the gradation correction tables a and b are tables in which the inputted digital image data 50 increases linearly and monotonously from 0 to 170 and a maximum value (=255) is outputted above 170. The gradation correction table c is assumed to be a table in which 0 is outputted at an address less than 170 but the digital image data 50 increases linearly and monotonously from 170 to 255.

Figure 3:
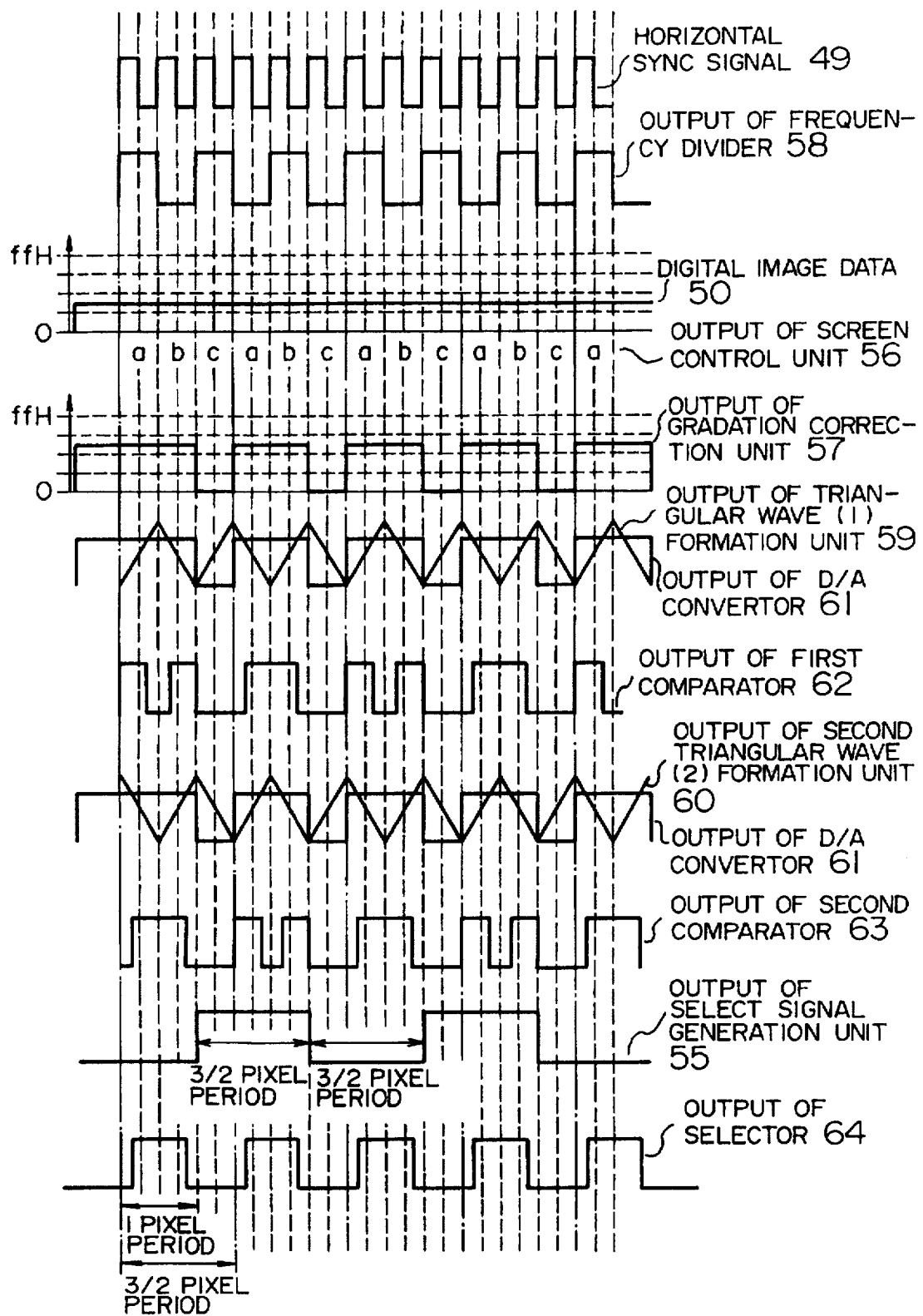
FIG. 3 shows the operation of the gradation control unit of the image formation apparatus according to the first embodiment.

The overall operation of the gradation control unit 48 in the image formation apparatus according to the first embodiment of the present invention will be explained with reference to FIG. 3. To simplify the explanation, it will be assumed that the digital image data 50 inputted to the gradation control unit 48 always continues to take a predetermined value and this value is ⅓ (=85) of the full data (=255).

First of all, the digital image data 50 is inputted from outside to the gradation control unit 48 in synchronism with the ½ frequency division signal of the horizontal sync signal 49 applied from outside. At this time, the screen control unit 56 outputs the signal representing which of the gradation correction tables a to c of the gradation correction unit 57 is to be selected, and the letters in FIG. 3 represents the selected gradation table. In other words, symbol a represents that the gradation correction table a is selected, and similarly, b and c represent that the gradation correction tables b and c are selected, respectively. In this way, the gradation correction tables a to c are periodically selected in synchronism with the horizontal sync signal 49, which is ½ times the transmission period of the digital image data 50.

Here, as is obvious from FIG. 2, when the value of the digital image data 50 (that is, the address inputted to the gradation correction tables a to c) is less than ⅔ (=170) of the full data (=255), the gradation correction unit 57 outputs a value which is ½ of the value of the digital image signal 50 while the gradation correction tables a and b are selected, and the output value is converted to an analog level signal by the D/A convertor 61. The first comparator 62 compares the output of the D/A convertor 61 with the output of the triangular wave (1) formation unit 59. When the output of this D/A convertor 61 exceeds the output of the triangular wave (1) formation unit 59, a Hi level signal is outputted, and a low level signal is outputted at other times. In this way, the output of the first comparator 62 shown in FIG. 3 can be obtained.

On the other hand, the second comparator 63 compares the output of the D/A convertor 61 with the output of the triangular wave (2) formation unit 60. When the output of the D/A convertor 61 exceeds the output of a triangular wave (2) formation unit 60, the Hi level signal is outputted, and a Low level signal is outputted at other times. In this way, the output of the second comparator 63 shown in FIG. 3 can be obtained.

The output of the select signal formation unit 55 is periodically toggled at a ½ pixel period in accordance with the output value of the main scanning ternary counter 53, and receiving the output of the select signal generation unit 55, the selector 64 alternately selects the output of the first comparator 62 and the output of the second comparator 63. If the selector 64 is set in such a fashion as to select the output of the first comparator 62 when the output of the select signal formation unit 55 is at a Hi level and to select the output of a second comparator 63 when it is at the Low level, the output of the selector 64 becomes such as shown in FIG. 3, and the pulse width modulation output can be obtained with a ½ pixel period.

In the first embodiment of the present invention, the value of the digital image signal 50 is assumed to be always equal for ease of understanding. However, it is obvious from the explanation given above that the pulse width of the output of the selector 64 becomes great when the value of the digital image data becomes great, and when the value of the digital image data 50 becomes small, on the contrary, the pulse width of the output from the selector 64 becomes small. In this way, pulse width modulation is effected in accordance with the value of the digital image data 50. The output of the selector 64 is used as the ON/OFF control signal of the laser in the laser driving unit 65 so that the laser is turned ON when the output of the selector 64 is Hi and is turned OFF when the output of the selector 64 is Low. A latent image having a size proportional to the value of the digital image data 50 is formed on a photosensitive member of the image formation apparatus in accordance with ON/OFF of the laser.

Figure 4:
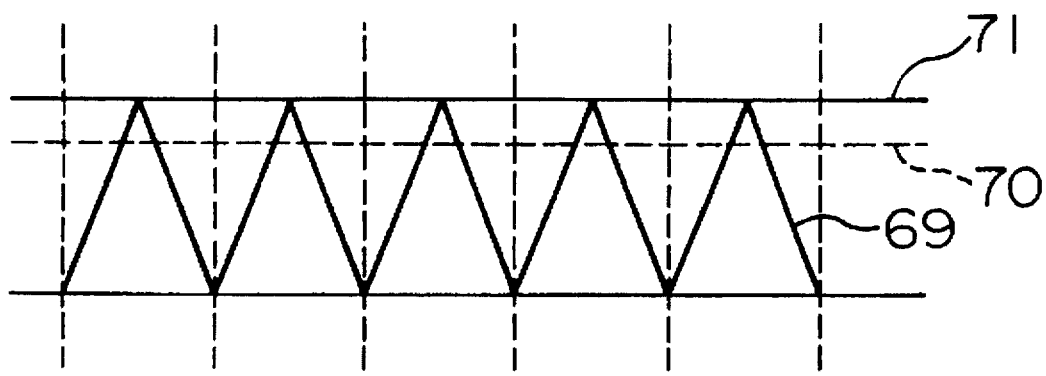
FIG. 4 is a relational diagram between the maximum value when an inputted digital image signal is converted to an analog signal in the gradation control unit of the image formation apparatus according to the first embodiment and a pattern signal for converting this analog image signal to a pulse width modulation signal.

Next, the D/A convertor 61 in the first embodiment of the present invention will be explained in detail. FIG. 4 is a relational diagram showing the relationship between the maximum value when the inputted digital image signal is converted to an analog signal and a pattern signal for converting this analog image signal to a pulse width modulation signal. In FIG. 4, reference numeral 71 denotes the maximum value of the analog image signal obtained by converting the digital image signal inputted to the image formation apparatus in the first embodiment to the analog signal, reference numeral 70 denotes the maximum value of the analog image signal obtained by converting the digital image signal inputted to the image formation apparatus according to the prior art to the analog signal, and reference numeral 69 denotes the pattern signal for converting the analog image signal to the pulse width modulation signal. As has already been explained in the "Description of the Related Art", since gradation is inferior in the high concentration zone of the output image in the image formation apparatus according to the prior art, the maximum value 70 of the analog image signal remains about 70% of the maximum value of the pattern signal 69. In contrast, in the image formation apparatus according to the first embodiment of the present invention, the maximum value 71 of the analog image signal is equal to the maximum value of the pattern signal 69.

Next, the difference between the maximum values 70 and 71 of the analog image signals will be explained. As has already been explained, pulse width modulation is generally effected by comparing a signal such as a triangular wave signal and other analog levels, and in this embodiment, the output of the pulse width signal is turned ON when the level obtained by converting the inputted digital image data 50 to an analog signal exceeds the level of the pattern signal 69. The greater the value of the inputted digital image data 50, the higher becomes the level obtained by converting the digital image data 50 to a analog level and eventually, the greater becomes the pulse width. When the maximum output level of the D/A convertor 61 is lower than the maximum level of the pattern signal 69, however, the upper limit of the pulse width is limited by the maximum output of the D/A convertor 61.

Let's hereby consider the case where the set value of the maximum output of the D/A convertor 61 is set to the maximum value 70 of the analog image signal. Under this state, the set value of the maximum value of the D/A convertor 61 is set to be lower than the maximum level of the pattern signal 69. Accordingly, the maximum value of the ON period of the pulse width does not exceed the period of the pattern signal 69 and if the period of the pattern signal 69 is 1, the maximum value of the ON period of the pulse width is always less than 1. In image formation apparatuses utilizing the electro-photographic process in combination with laser techniques in general, the ratio of the maximum output of the pattern signal 69 to the maximum output of the D/A convertor 61, that is, the ratio of the longest period of the ON period to the period of the pattern signal 69 (hereinafter referred to simply as the "duty") is set to a value from about 0.6 to about 0.8 in most cases as has been explained in the "Description of the Related Art". This is because black batter occurs and gradation reproducibility gets remarkably deteriorated in the high concentration zone in the gradation control method explained in the "Description of the Related Art" when the maximum duty is set to near 1.0. In this embodiment, however, the set value of the maximum output of the D/A convertor 61 is represented as the maximum value 71 of the analog image signal, and the duty is set substantially to 1.0.

Figure 5:
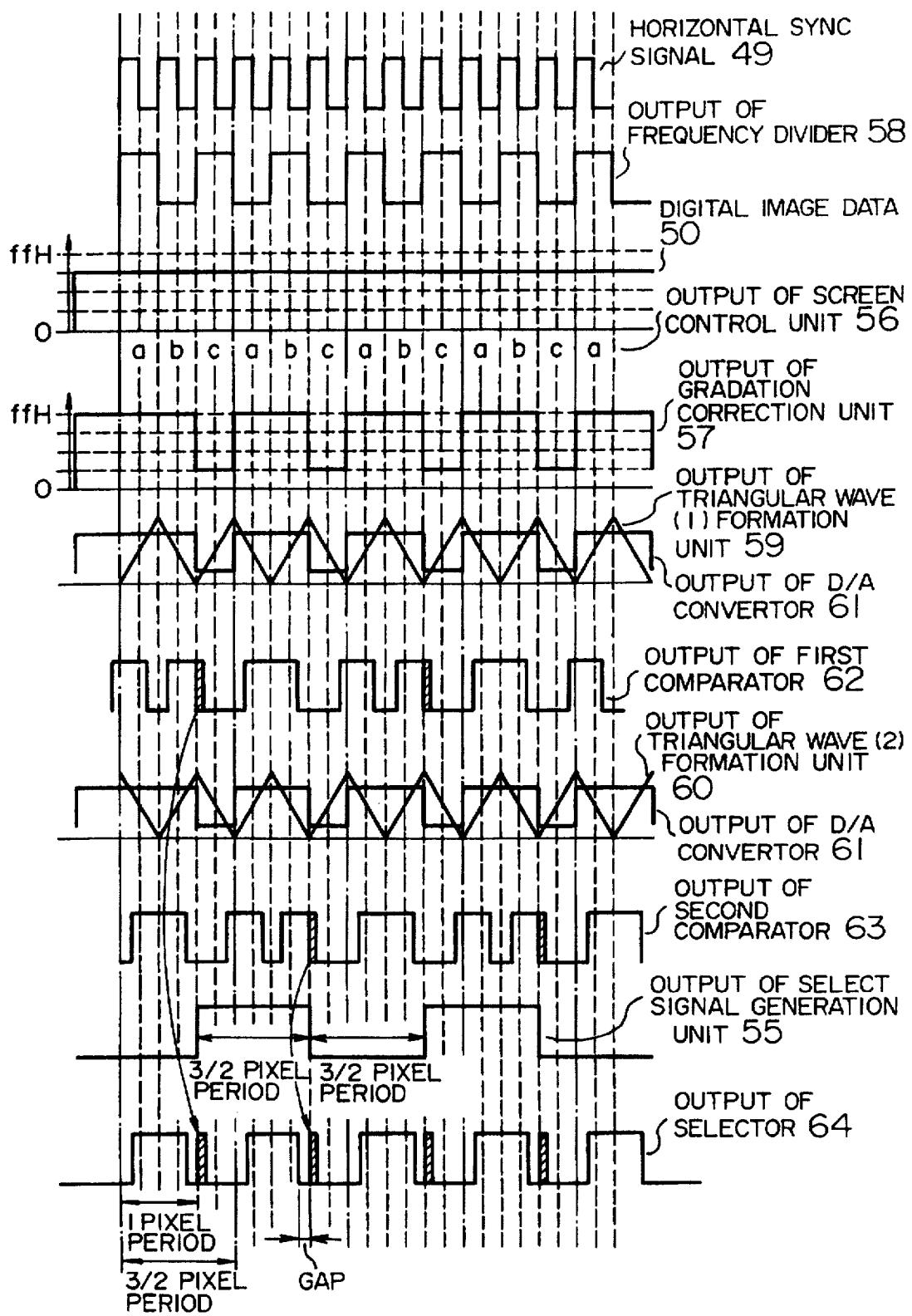
FIG. 5 shows the operation of the gradation control unit when a set value of the maximum output of a D/A convertor of the gradation control unit of the image formation apparatus according to the first embodiment is assumed to be set to a lower level than the maximum level of the pattern signal.

The reason why this duty is set to about 1.0 will be explained next. First, FIG. 5 shows the operation of the gradation control unit 48 when it will be assumed that the set value of the maximum output of the D/A convertor 61 is set below the maximum level of the pattern signal 60 in the same way as in the prior art, or more definitely, when it is assumed that the maximum duty is limited to about 0.7. To simplify the following explanation, it will also be assumed that the digital image data 50 inputted to the gradation control unit 48 always takes a predetermined value, and this value is ¾ (=191) of the full data (=255).

First of all, the digital image data 50 is inputted from outside to the gradation control unit 48 in synchronism with the frequency division signal of the horizontal sync signal 49 given from outside. At this time, the screen control unit 56 outputs the signal for selecting which of the gradation correction tables a to c of the gradation correction unit 57 is to be selected, and the letters in FIG. 5 represents the selected gradation table. In other the symbol a represents that the gradation correction table a is selected, and similarly, b and c represent that the gradation correction tables b and c are selected, respectively. In this way, the gradation correction tables a to c are periodically selected in synchronism with the horizontal sync signal 49, which is ½ times the transmission period of the digital image data 50.

Here, as is obvious from FIG. 2, the value of the digital image data 50 is greater than ⅔ (=170) of the full data (=255). Therefore, 255 is outputted from the gradation correction unit 57 while the gradation control tables a and b are selected, and the product obtained by multiplying the difference (191–170) by 3 is outputted from the gradation correction unit 57 while the gradation correction table c is selected. In other words, (191–170)*3=63(=255/4) is outputted. The output from this gradation correction unit 57 is converted to an analog level signal by the D/A convertor 61, but the set value of the maximum output of the D/A convertor is so set as to be lower than the maximum level of the pattern signal 69. The first comparator 62 compares the output of this D/A convertor 61 and the output of the triangular wave (1) formation unit 59, outputs a Hi level signal when the output of the D/A convertor 61 exceeds the output of the triangular wave (1) formation unit 59, and outputs a Low level signal at other times. In this way, the output of the first comparator 62 shown in FIG. 5 can be obtained.

On the other hand, the second comparator 63 compares the output of the D/A convertor 61 with the output of the triangular wave (2) formation unit 60, outputs a Hi level signal when the output of the D/A convertor 61 exceeds the output of the triangular wave (2) formation unit 60 and outputs a Low level signal at other times. In this way, the output of the second comparator 63 shown in FIG. 5 can be obtained.

The output of the select signal formation unit is toggled at a ½ pixel period in accordance with the count value of the main scanning ternary counter 53. Receiving the output of the select signal formation unit 55, the selector 64 alternately selects the output of the first comparator 62 and the output of the second comparator 63. Here, when the selector 64 is so set as to select the output of the first comparator 62 when the output of the select signal formation unit 55 is at a Hi level and to select the output of the second comparator 63 when the output of the select signal formation unit 55 is at a Low level, the output of the selector 64 becomes such as shown in FIG. 5, and a pulse width modulation output can be obtained with a ½ pixel period.

However, because the set value of the maximum output of the D/A convertor 61 is hereby set to be smaller than the maximum level of the pattern signal 69, the pulse width of the period in which the maximum value 255 is outputted by the gradation correction tables a and b does not reach one pixel period width, so that a gap occurs with the period in which the gradation correction table c is selected.

Figure 6:
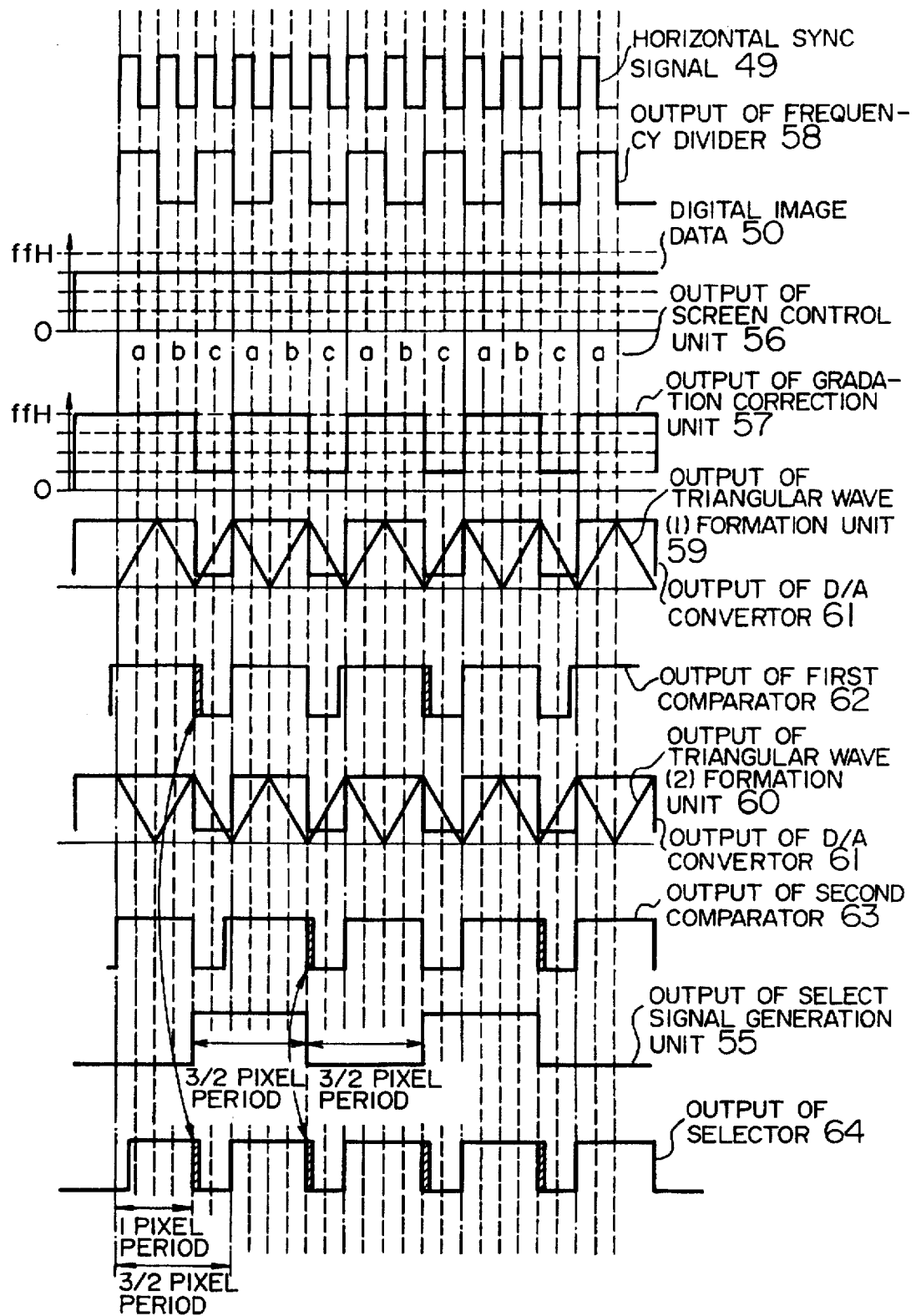
FIG. 6 shows the operation of the gradation control unit when the set value of the maximum output of the D/A convertor of the gradation control unit of the image formation apparatus according to the first embodiment is equal to the maximum level of the pattern signal.

Next, the operation of the gradation control unit 48 will be explained with reference to FIG. 6 when the set value of the maximum output of the D/A convertor 61 is equal to the maximum level of the pattern signal 69, that is, when the maximum duty is set to about 1.0.

To have the following explanation more easily understood, it will be assumed that the digital image data 50 inputted to the gradation control unit 48 continues to take always a constant value, and that this value is ¾ (=191) of the full data (=255).

First, the digital image data 50 is inputted from outside to the gradation control unit 48 in synchronism with the ½ frequency division signal of the horizontal sync signal 49 given from outside. At this time, the screen control unit 56 outputs a signal representing which of the gradation correction tables a to c of the gradation correction unit 57 is to be selected, and the letters in FIG. 6 represent the selected gradation correction table. In other words, a represents that the gradation correction table a is selected, and similarly, b and c represent that the gradation correction tables b and c are selected, respectively. In this way, the gradation correction tables a to c are periodically selected in synchronism with the horizontal sync signal 49, which is ½ times the transmission period of the digital image data.

Here, as is obvious from FIG. 2, the value of the digital image data 50 is greater than ⅔ (=170) of the full data (=255). Accordingly, 255 is outputted from the gradation correction unit 57 while the gradation correction tables a and b are selected, and the product obtained by multiplying the difference from "170" by 3, that is, "63", is outputted from the gradation correction unit 57. The output from this gradation correction unit 57 is converted to an analog level signal by the D/A convertor 61, but the set value of the maximum output of the D/A convertor 61 is so set as to be equal to the maximum level of the pattern signal 69. The first comparator 62 compares the output of this D/A convertor 61 with the output of the triangular wave (1) formation unit 59. A Hi level signal is outputted when the output of the D/A convertor 61 exceeds the output of the triangular wave (1) formation unit and a Low level signal is outputted at other times. In this way, the output of the first comparator 62 shown in FIG. 6 is obtained.

On the other hand, the second comparator 63 compares the output of the D/A convertor 61 with the output of the triangular wave (2) formation unit 60. A Hi level signal is outputted when the output of the D/A convertor 61 exceeds the output of the triangular wave (2) formation unit 60 and a Low level signal is outputted at other times. In this way, the output of the second comparator 63 shown in FIG. 6 is obtained.

The output of the select signal generation unit 55 is periodically toggled at a ½ pixel period. Receiving the output of this select signal generation unit 55, the selector 64 alternately selects the output of the first comparator 62 and the output of the second comparator 63. Here, when the selector 64 is so set as to select the output of the first comparator 62 when the output of the select signal generation unit 55 is at a Hi level and to select the output of the second comparator 63 when the output of the select signal generation unit 55 is at a Low level, the output of the selector 64 becomes such as shown in FIG. 6, and a pulse width modulation output can be obtained with a ½ pixel period.

Here, since the set value of the maximum output of the D/A convertor 61 is equal to the maximum level of the pattern signal 69, the pulse width outputted from the selector 64 is greater than in the case where the set value of the maximum output of the D/A convertor 61 is smaller than the maximum level of the pattern signal 69 as shown in FIG. 5, although the value of the digital image data 50 is equal. Accordingly, when the set value of the maximum output of the D/A convertor 61 is equal to the maximum output level of the pattern signal 69, the pulse width in the periods in which the maximum value 255 is outputted by the gradation correction tables a and b reaches a one pixel period width, so that no gaps occurs between the periods in which the gradation correction table b is selected and the periods in which the gradation correction table c is selected.

In the first embodiment of the present invention, the set value of the maximum output of the D/A convertor 51 is set to be equal to the maximum output of the pattern signal 69. In other words, the maximum duty of the pulse width is substantially 1.0. For, if any gap occurs between the portions at which the selection of the gradation correction tables a to c changes as shown in FIG. 5, a phenomenon in which the output density does not rise or rather reverses, that is, so-called "gradation reversal", occurs, although the laser exposure quantity increases with respect to the time axis.

Figure 7:
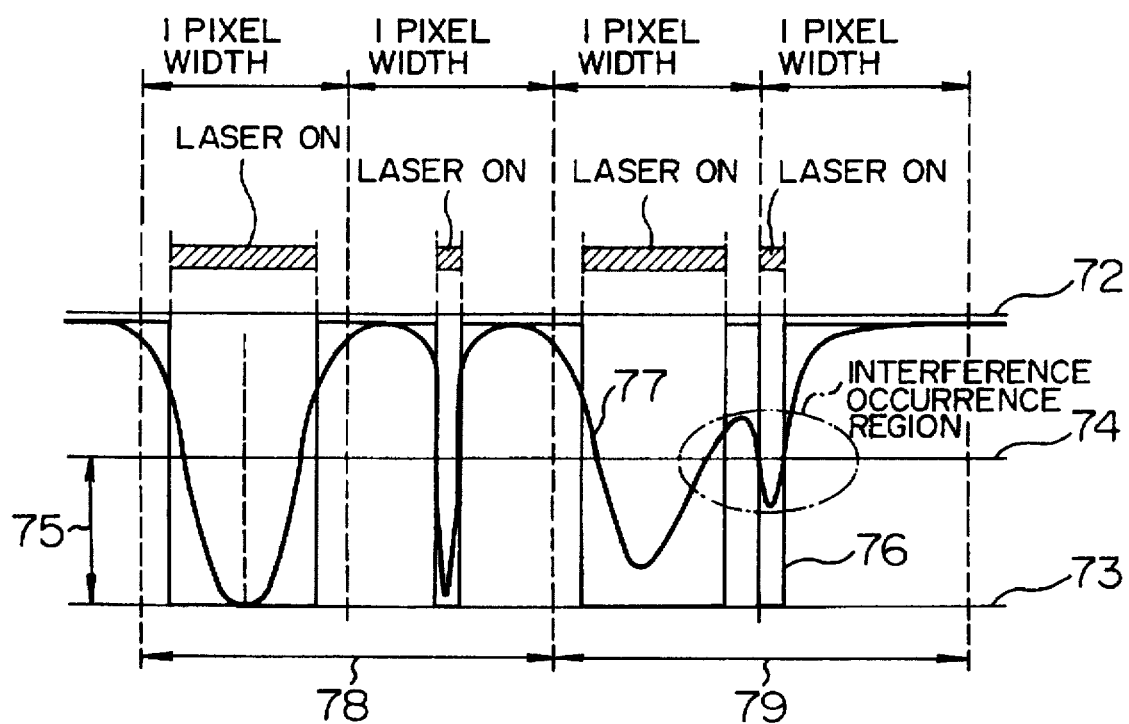
FIG. 7 shows a process of occurrence of gradation reversal in the image formation apparatus according to the first embodiment.

Hereinafter, the process in which this gradation reversal occurs will be explained in detail with reference to FIG. 7. In FIG. 7, reference numeral 72 denotes a charge potential. This is a potential to which the photosensitive member is electrically charged by a charger, and is generally about −700 V. Reference numeral 73 denotes an exposure potential, which represents the potential when the exposure beams are continuously irradiated to the photosensitive member after exposure. The exposure potential is generally from about −100 to about −50 V. Since the exposure potential is the potential of the portion to which laser (beams) is irradiated, it is sometimes referred to as a "bright potential". Reference numeral 74 denotes a developing bias, which represents a bias level applied to a developing sleeve of a developing machine. The developing bias is generally set to about −300 V.

With the potential set as described above, the quantity of a toner supplied from the developing sleeve to the photosensitive member increases with a greater potential difference 75 between the exposure potential 73 and the developing bias 74. In other words, the potential difference 54 is an extremely important factor for determining the development concentration in conjunction with the pulse width.

When the laser-ON periods are set as shown in FIG. 7, reference numeral 76 denotes ideal exposure potential characteristics, and only the portion to which the laser is irradiated is at the exposure potential 73. Reference numeral 77 denotes the actual potential characteristics, which are broad characteristics for the laser-ON periods. In FIG. 7, a first region 78 is a the region in which the photosensitive member is exposed with a pulse width falling sufficiently within one pixel width and with a short pulse width at a sufficiently spaced apart portion. In the actual exposure potential characteristics 77, no interference exists between the two pulses and each pulse contributes to the rise of the concentration.

On a other hand, a second period 79 is the region in which the photosensitive member is exposed with a pulse width falling within one pixel width and is further exposed with a short pulse width at a portion very close to this pulse. In the actual exposure potential characteristics 77, a strong interference phenomenon occurs between the two pulses, and the exposure potential 73 cannot be secured (the region in which the interference occurs between the two laser-ON periods is represented by an ellipse). Accordingly, since the quantity in toner for development increases with a greater potential difference 75, the developing quantity of the second region 79 becomes smaller than the developing quantity in the first region 78. In other words, the concentration drops. Accordingly, even when the same laser energy is irradiated on the photosensitive member, a difference in concentration occurs depending on the formation condition of the laser pulses.

Incidentally, the condition of this second region 79 is strikingly similar to the very condition shown in FIG. 5. In other words, in FIG. 5, too, two pulses exist very close to one another with a very small gap between them, and interference occurs. As a result, the portions represented by crosshatching are formed in the output of the selector 64 in FIG. 5, and the concentration becomes higher in the case where only one pulse exists in the ½ pixel period.

The above explains the occurrence of the gradation reversal. To avoid this gradation reversal, it is necessary to set the set value of the maximum output of the D/A convertor 61 to be equal to the maximum level of the pattern signal so as to prevent the occurrence of a gap in the laser pulses at the switch portion from the gradation correction table b to the gradation correction table c as shown in FIG. 6.

However, when the set value of the maximum output of the D/A convertor 61 is set to be equal to the maximum level of the pattern signal 69, the gradation reversal does not occur, but the batter of the image occurs in a high concentration zone.

Figure 8A:
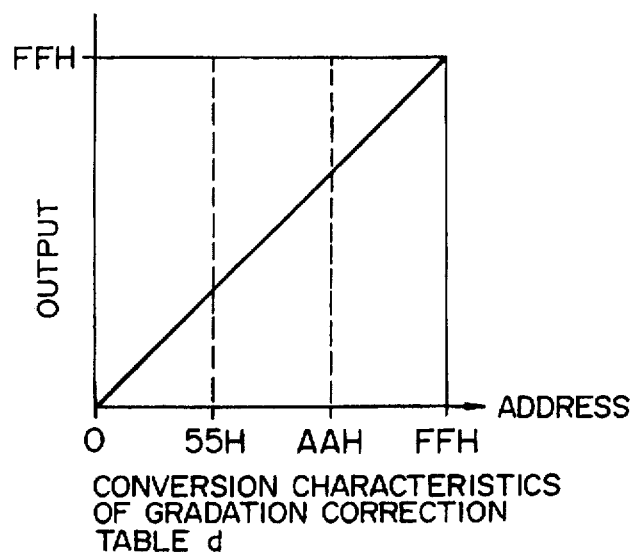
FIG. 8A shows a gradation correction table for restricting a batter of the gradation control unit of the image formation apparatus according to the first embodiment.
Figure 8B:
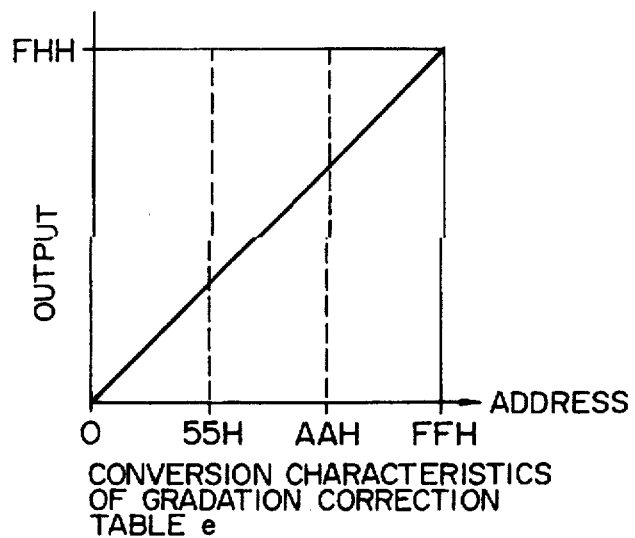
FIG. 8B shows the. gradation correction table for restricting the batter of the gradation control unit of the image formation apparatus according to the first embodiment.
Figure 8C:
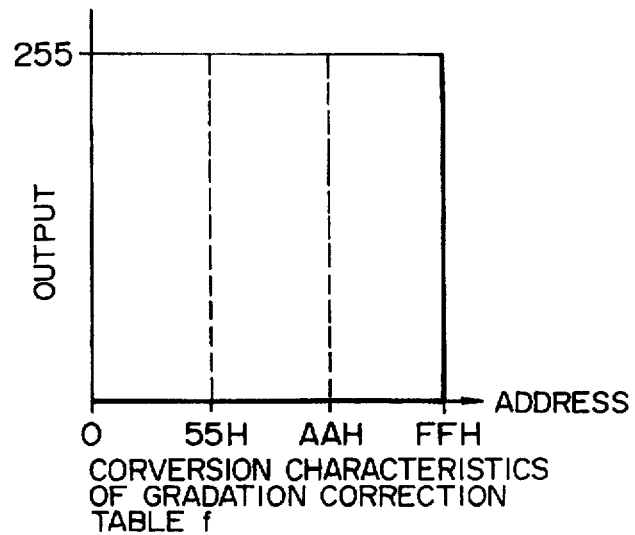
FIG. 8C shows the gradation correction table for restricting the batter of the gradation control unit of the image formation apparatus according to the first embodiment.

Next, the method of restricting this batter using the image formation apparatus according to the first embodiment of the present invention will be explained. FIGS. 8A to 8C show an example of the gradation correction tables for restricting the batter in the image formation apparatus according to the first embodiment of the present invention. In practical image formation apparatuses, non-linear tables are set in many cases in order to linearly correct the gradation characteristics of the apparatuses. For ease of explanation, however, it will be hereby assumed that the gradation correction tables d and e are tables which output a value equal to the inputted digital image data 50, and the gradation correction table f is a table which outputs 0 when the data is less than 255 (full data) and outputs 255 (full data) when 255 (full data) is inputted. In other words, the gradation correction table f is assumed to have characteristics which do not at all contribute to the gradation reproduction.

Here, the reason why the gradation correction table f is so set as not to contribute to the gradation reproduction will be explained. When the gradation correction tables d to f are set as shown in FIGS. 8A to 8C, only the pulse width of the region corresponding to the gradation correction tables d and e is restricted while the digital image data 50 does not have the maximum value (=255), and the pulse of the region corresponding to the gradation correction table f is not outputted. Accordingly, the ⅔ pixel among the maximum 3/2 pixels grows, and the duty becomes substantially ⅔, that is, 66.7%.

As described above, the substantial duty can be reduced by changing the setting of the gradation correction tables d to f while keeping the setting of the maximum output of the D/A convertor 61 equal to the maximum output of the pattern signal 69. Accordingly, the batter in the high concentration zone can be restricted and gradation can be secured.

When pulse width modulation is effected in a one pixel period in the prior art, the maximum duty which the laser substantially emits is about 70% and corresponds to about 0.7 pixel. In the first embodiment of the present invention described above, however, the maximum duty of the laser emission becomes perfectly one pixel. Therefore, the pixel ratio becomes 1/0.7=1.43, and the size of the pixel can be enlarged by 43% in comparison with one-dot modulation according to the prior art. In other words, gradation can be improved.

Figure 9:
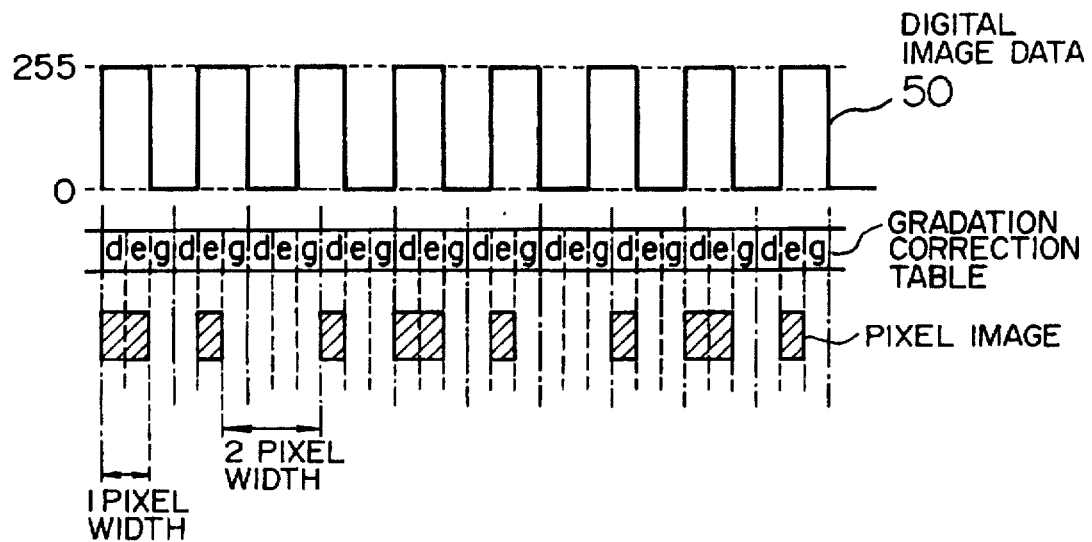
FIG. 9 shows thin line reproduction when two gradation correction tables of the gradation correction unit of the image formation apparatus according to the first embodiment are those tables which output a value equal to that of the inputted digital image data and the remaining one gradation correction table is the one that always outputs 0 irrespective of the value of the digital image data.

Next, the reason why the gradation correction table f is provided with the function of outputting 255 when 255 (full data) is inputted thereto will be explained. FIG. 9 shows thin line reproduction in the case where the gradation correction tables d and e are assumed to be the tables shown in FIGS. 8A and 8B, which output a value equal to the value of the inputted digital image data 50, and a gradation correction table g is one which always outputs 0 irrespective of the value of the digital image data 50. Here, a pattern which repeats ON/OFF of the pixels for each pixel in a direction for forming one line (hereinafter referred to as the "main scanning direction") is desired to be formed, and the digital image data 50 alternately repeats 0 and 255 for each pixel. The gradation tables d and e are tables which output a value equal to the inputted digital image data 50 and the gradation correction table g is one which always outputs 0 whichever value the digital image data 50 may take. Therefore, the pixel images become such as those shown in the drawing. In other words, since the digital image data 50 corresponding to the gradation correction table g are not at all reproduced, the data which should be originally reproduced for each pixel partly falls off. When this phenomenon occurs in practice, a strong texture develops on the image, and image quality is remarkably deteriorated.

In natural pictures in general, the correlationship between the adjacent pixels is extremely high and redundancy, too, is high. Accordingly, degradation of image quality cannot be discriminated by eye even when the method of the first embodiment of the present invention, which forms the image using only ⅔ of the entire pixels by setting a part of the gradation correction tables in such a manner as not to contribute to the gradation characteristics, is employed. However, when data that have conventionally been dealt with as binary data such as characters, line drawings, and so forth, are allowed to fall off in the same rule as the natural pictures, image quality is remarkably deteriorated.

Figure 10:
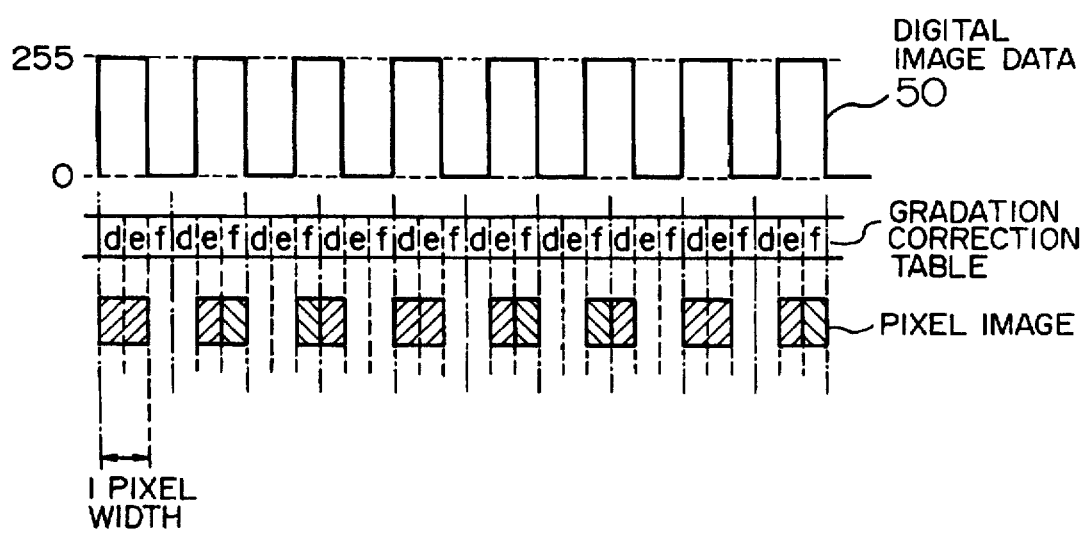
FIG. 10 shows thin line reproduction when two gradation correction tables of the gradation correction unit of the image formation apparatus according to the first embodiment are those tables which output a value equal to the value of the inputted digital image data and the remaining one gradation correction table is the one that outputs 0 when the value of the digital image data is less than 255 and outputted 255 when the digital image data is 255.

FIG. 10 shows thin line reproduction in the case where the gradation correction tables d and e are tables which output a value equal to the inputted digital image data 50 and the gradation correction table f is a table which outputs 0 when the value of the digital image data 50 is less than 255 and outputs 255 when the digital image data 50 is 255, that is, the gradation correction tables d to f shown in FIGS. 8A to 8C, are used. Setting of the digital image data 50 is in common to the setting shown in FIG. 9.

Here, the setting is made in such a manner that the gradation correction table f does not contribute to the gradation. However, since it outputs 0 when the input is other than 255 and 255 when the input is 255, fall-off of the data does not at all occur in the pixel image as shown in the drawing (reverse-hatched portions represent the pixel image added by the characteristics of the gradation correction table f).

As is obvious from the explanation given above, the gradation correction tables d and e can determine the maximum duty of the laser pulse width. Accordingly, in the image formation apparatuses according to the prior art, the maximum duty has been determined by the adjustment of hardware portions of the D/A convertor (setting of a reference potential of the D/A convertor) in laser pulse width modulation, and it has therefore been difficult to absorb the influences of variance between the machines and influences of the changes with time for the D/A convertor. However, this control can be made in the image formation apparatus according to the first embodiment of the present invention.

In other words, the gradation correction tables d to f are accessible from outside (for example, from a CPU, etc.). For example, the maximum duty of the laser pulse width can be controlled by feeding back the concentration detection result by a concentration sensor, etc., for detecting the concentration of the toner image to the generation rule of the gradation correction tables d and e, more specifically, to the upper limit values of the gradation correction tables d and e, and in this way, the maximum concentration, etc., of the image formation apparatus can be periodically self-adjusted.

Figure 11:
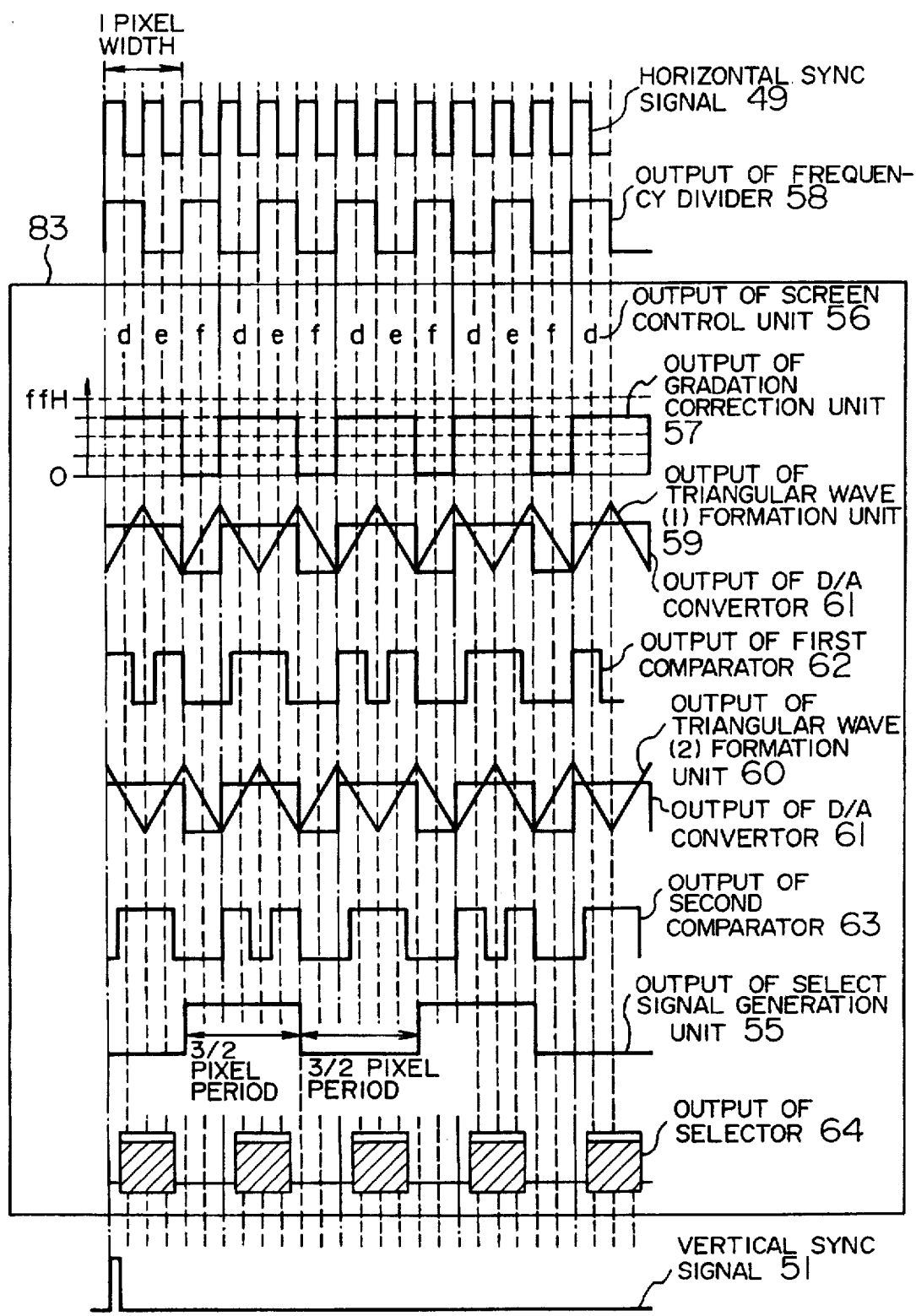
FIG. 11 shows the operation of the gradation control unit when a screen angle is formed on an output image by the gradation control unit of the image formation apparatus according to. the first embodiment.
Figure 12:
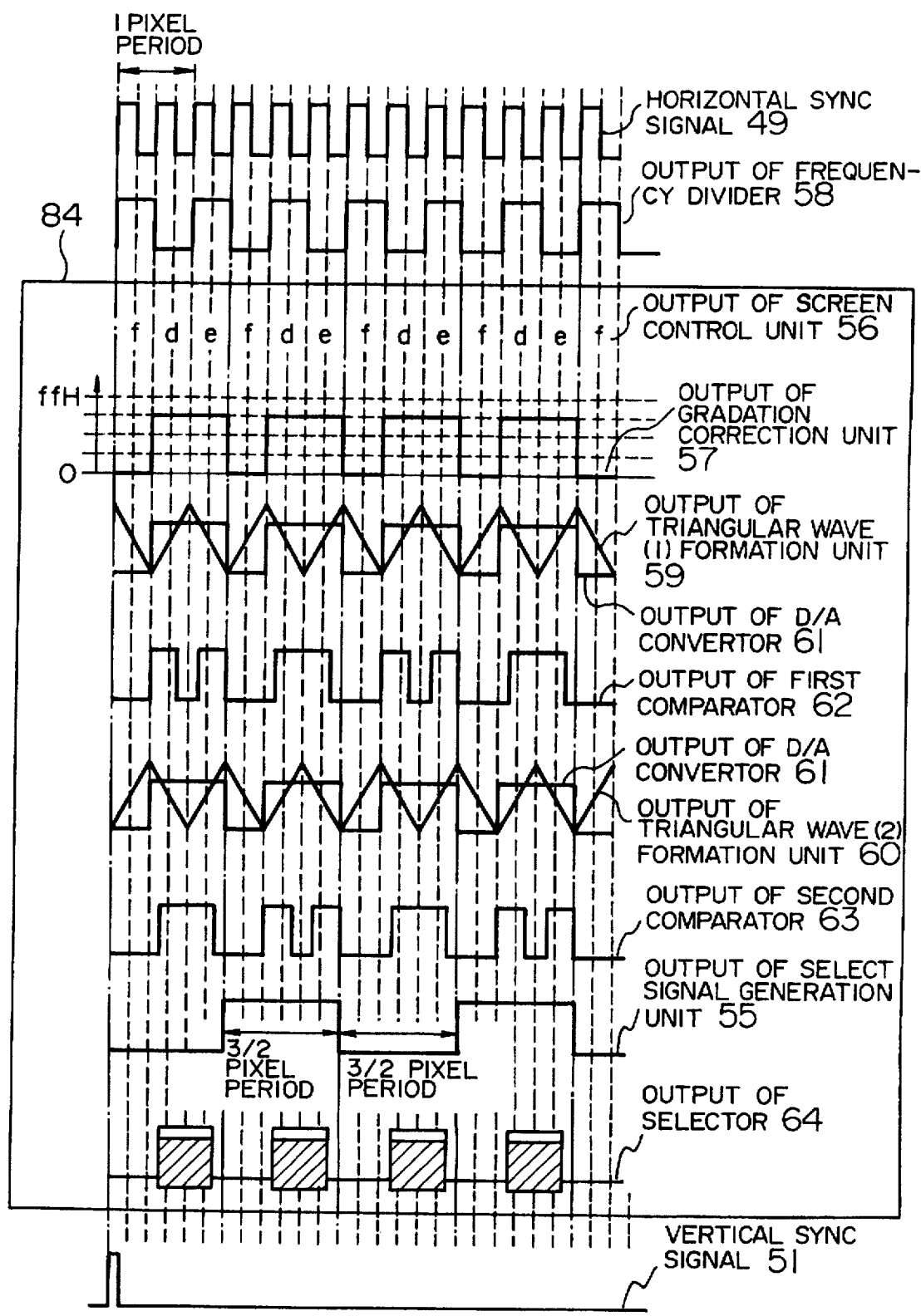
FIG. 12 shows the operation of the gradation control unit when the screen angle is formed on the output image by the gradation control unit of the image formation apparatus according to the first embodiment.
Figure 13:
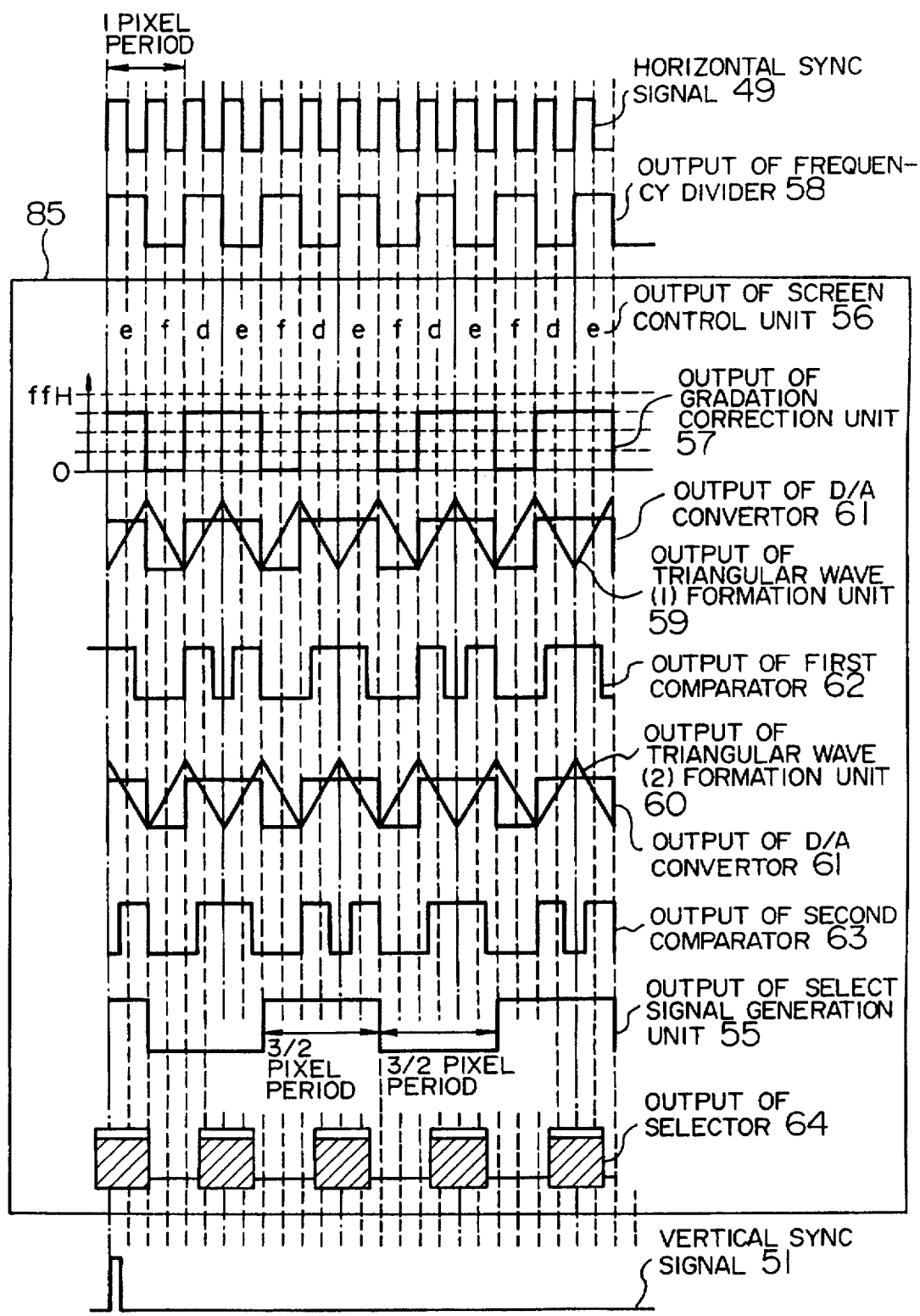
FIG. 13 shows the operation of the gradation control unit when the screen angle is formed on the output image by the gradation control unit of the image formation apparatus according to the first embodiment.

Next, a method of forming a screen angle on the output image on the basis of the first embodiment of the present invention will be explained with reference to FIGS. 11 to 13. The screen angle is a means which has long been employed in the field of printing and which makes a degree of overlap of each color pixel probable by forming a predetermined angle in a pixel arrangement and changing the angle of this pixel arrangement (screen angle) for each of the printing colors (cyan, yellow, magenta, black). This screen angle method can prevent any position errors from being very noticeable even when the form plate of each color has such position errors, because overlap of the pixels of each color is probable.

In the following explanation, it will be assumed that the gradation correction tables d to f shown in FIGS. 8A to 8C are used. FIG. 11 shows the operation of the gradation control unit 48 when an n-th line is printed, and FIGS. 12 and 13 show the operation when an (n+1)th line an are (n+2)th line are printed, respectively. Here, n is a multiple of 3 greater than 0. In practice, the vertical sync signal 51 shown in FIG. 1 is counted by the sub-scanning ternary counter 54 and the horizontal sync signal 49 is counted by the main scanning ternary counter 53. The screen control unit 56 determines the initial values of the gradation correction tables d to f whenever the sub-scanning ternary counter 54 is counted up, and the gradation correction tables d to f are periodically selected thereafter whenever the main scanning ternary counter 53 is counted up. The select signal generation unit 55 generates the select signals for the first and second comparators 62 and 63 on the basis of the outputs of the main scanning ternary counter 53 and the sub-scanning ternary counter 54. The screen angle is generated by changing the control rule of these select signal generation unit 55 and screen control unit 56.

First of all, when the vertical sync signal 51 is detected in printing 83 of the n-th line, the output of the screen control unit 56 is set to the initial value d and subsequently, e, f and d are periodically repeated in synchronism with the horizontal sync signal 49. The output of the select signal generation unit 55 is set to a Low level, changes to a Hi level when a ½ pixel period passes away twice, and thereafter alternates between a Low level and a Hi level at a ½ pixel period. Accordingly, the pixel image applied with the half tone can be formed by printing 83 of the n-th line.

Next, when the vertical sync signal 51 is detected in printing 84 of the (n+1)th line, the output of the screen control unit 56 is set to the initial value f and thereafter d, e and f are periodically repeated in synchronism with the horizontal sync signal 49. The output of the select signal generation unit 55 is set to a Low level, changes to a Hi level when a ½ pixel period passes away thrice, and thereafter alternates between a Low level and a Hi level at a ½ pixel period. Accordingly, the pixel image applied with the half tone is formed at printing 84 of the n-th line. When printing 83 of the n-th line and printing 84 of the (n+1)th line are compared with each other, it can be understood that the phase of the pixel image changes by ½ pixel.

Finally, when the vertical sync signal 51 is detected in printing 85 of the (n-2)th line, the output of the screen control unit 55 is set to the initial value e and subsequently, f, d and e are periodically repeated in synchronism with the horizontal sync signal 49. The output of the select signal generation unit 55 is set to a Hi level, changes to a Low level when a ½ pixel period passes away once, and thereafter alternates between a Hi level and a Low level at a ½ pixel period. Accordingly, the pixel image applied with the half tone is formed in printing 85 of the (n+2)th line. When printing 83 of the n-th line and printing 85 of the (n+2)th line are compared with each other, it can be understood that the phase of the pixel image changes by ⅔ pixel.

After the three lines are formed as described above, the operation of the gradation control unit 48 is shifted to the mode of printing 83 of the n-th line. Then, the pixel image is outputted while always changing by ½ pixel, and the screen angle is formed on the output image.

Figure 14:
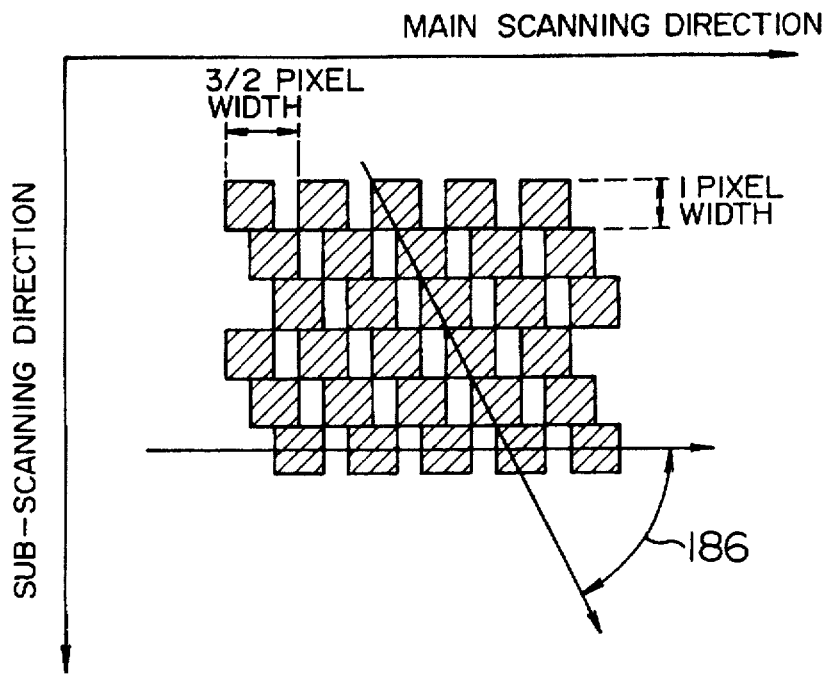
FIG. 14 shows pixel images of the screen angles formed by the image formation apparatus according to the first embodiment.

FIG. 14 shows only the pixel image of the screen angle formed on the basis of the operation described above. The pixel. pitch in a direction (sub-scanning direction) vertical to the line formation direction (main scanning direction) has a one-pixel width. Therefore, the direction in which the pixels continue in the line formation direction, that is, the screen angle 186, is −63.4° (counter-clockwise rotation with respect to the main scanning direction as the reference is assumed to be "+").

In the first embodiment of the present invention, the image is formed while changing the screen angle for each color. A screen angle other than the one shown in FIG. 14 can be formed by changing the output rules of the select signal formation unit 55 and the screen control unit 56 by the color select signal shown in FIG. 1.

When printing of the n-th line is performed, for example, the output of the screen control unit 56 is set to the initial value d when the vertical sync signal 51 is detected, and thereafter e, f and d are periodically repeated in synchronism with the horizontal sync signal 49. The output of the select signal generation unit 55 is set to a Low level, changes to a Hi level when a ½ pixel period passes away twice, and thereafter alternates between a Low level and a Hi level at a ½ pixel period. When printing of the (n+1)th line is performed, the output of the screen control unit 56 is set to the initial value e when the vertical sync signal 51 is detected, and thereafter f, d and e are periodically repeated in synchronism with the horizontal sync signal 49. The output of the select signal generation unit 56 is set to a Hi level, changes to a Low level when a ½ pixel period passes away once, and thereafter alternates between a Hi level and a Low level at a ½ pixel period. Further, when printing of the (n+2)th line is performed, the output of the screen control unit 56 is set to the initial value f when the vertical sync signal 51 is detected, and thereafter d, e and f are periodically repeated in synchronism with the horizontal sync signal 49. The output of the select signal generation portion 55 is set to a Low level, changes to a Hi level when a ½ pixel period passes away thrice, and thereafter alternates between a Low level and a Hi level. In other words, when the cycle of printing 83 of the n-th line used in FIG. 11, printing 84 of the (n+1)th line used in FIG. 12 and printing 85 of the (n+2)th line used in FIG. 13 is reversed, a screen angle of +63.4° can be formed.

Figure 15:
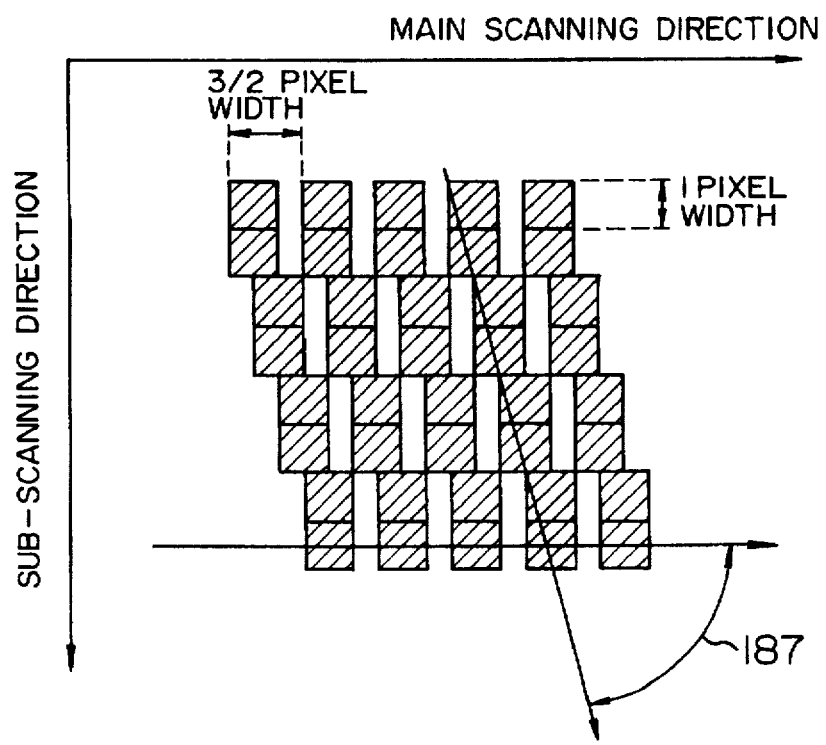
FIG. 15 shows the pixel images of a screen angle of −76.0° formed by the image formation apparatus according to the first embodiment.

When an image is formed by effecting twice the image formation in accordance with the output rule of printing 83 of the n-th line, effecting twice the image formation in accordance with the output rule of printing 84 of the (n+1)th line, and effecting twice the image formation in accordance with the output rule of printing 85 of the (n+2)th line, and so forth, a screen angle 187 of −76.0° can be formed as shown in FIG. 15. A screen angle of +76.0° can be formed by repeating twice the output rule for forming the screen angle of +63.4° as described above.

(Embodiment 2)

Next, the second embodiment of the present invention will be explained.

Figure 16:
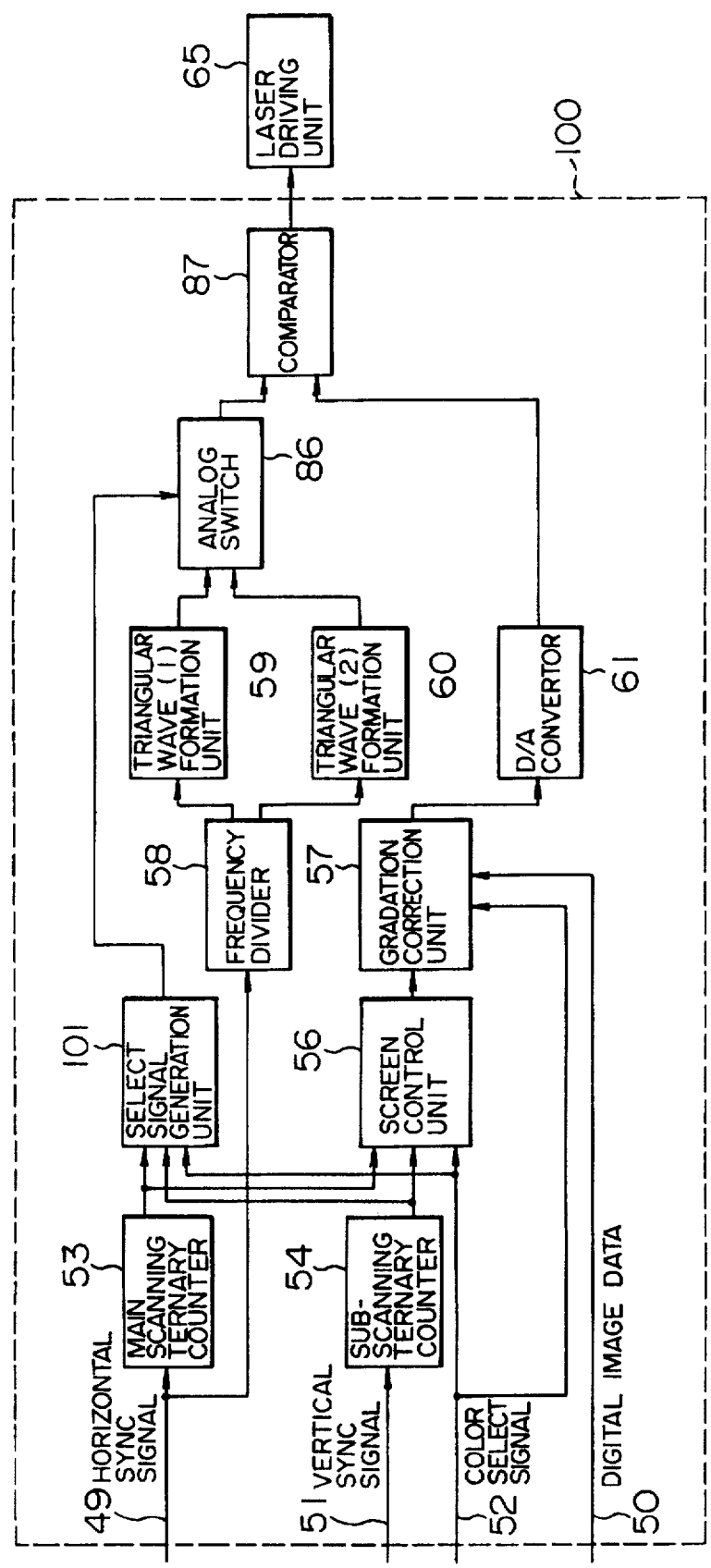
FIG. 16 is a block diagram of the gradation control unit of the image formation apparatus according to the second embodiment of the present invention.

FIG. 16 is a block diagram of the gradation control unit of an image formation apparatus according to the second embodiment of the present invention. In FIG. 16, reference numeral 100 denotes the gradation control unit of the image formation apparatus. As for the signals inputted to this gradation control unit 100 and in the blocks constituting this gradation control unit 100, explanations of the same signals and the same constituents as those in the first embodiment will be omitted. Reference numeral 101 denotes a select signal generation unit, which inputs the signals from the main scanning ternary counter 53, the sub-scanning ternary counter 54 and the color select signal 52, and determines which of the triangular wave (1) formation unit 59 and the triangular wave (2) formation unit 60 that an analog switch 86 is to select. Reference numeral 86 denotes the analog switch, which selects the output of the triangular wave (1) formation unit 59 and the triangular wave (2) formation unit 60 in accordance with the output of the select signal generation unit 55. Reference numeral 87 denotes a comparator, which compares the output of the triangular wave (1) formation unit 59 or the output of the triangular wave (2) formation unit 60 selected by the analog switch 86 with the output of the D/A convertor 61 and converts it to a pulse width. In this second embodiment, the explanation will be presented on the premise that the gradation correction tables d to f shown in FIG. 8 are used.

Figure 17:
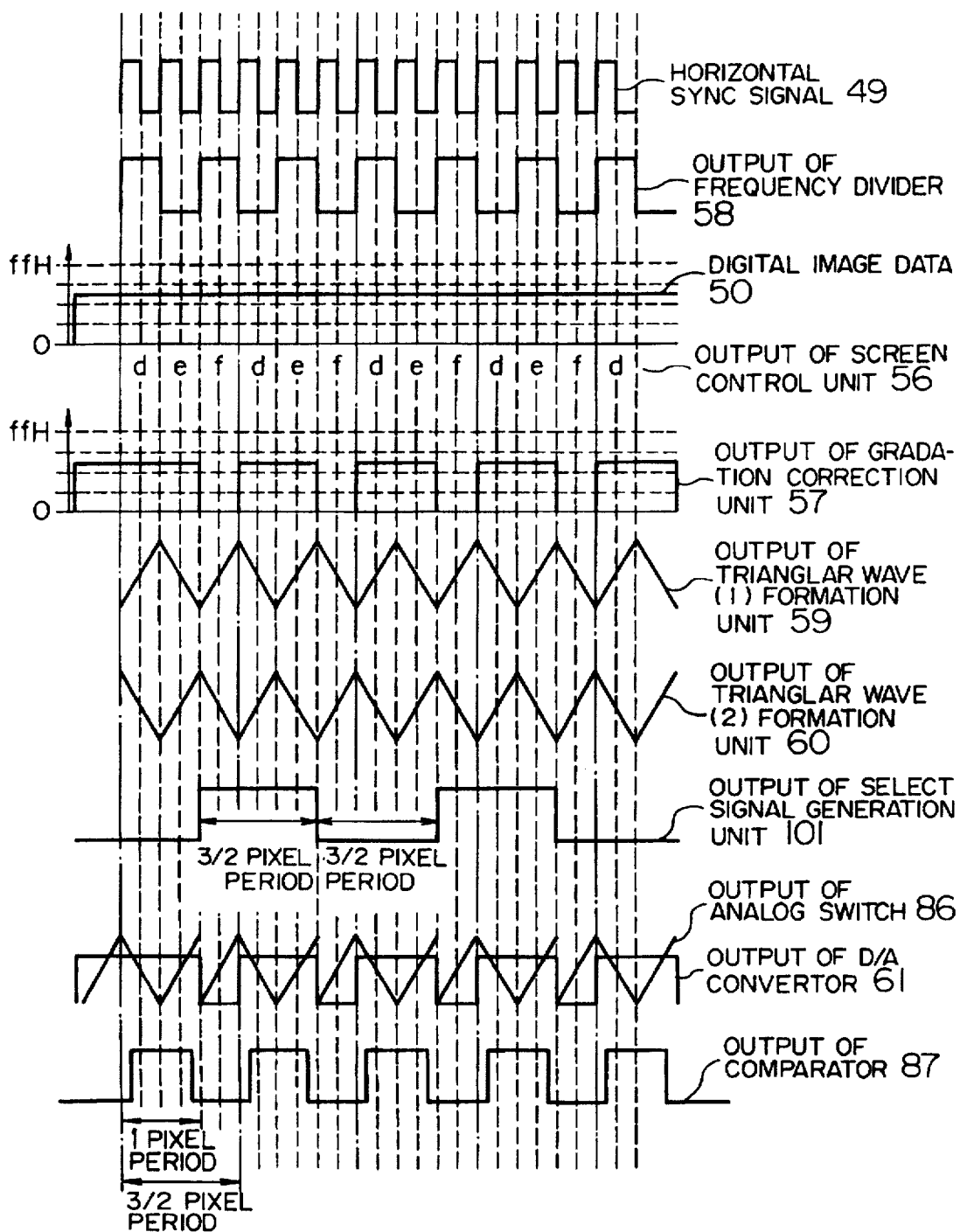
FIG. 17 shows the operation of the gradation control unit of the image formation apparatus according to the second embodiment.

Next, the operation of the gradation correction unit 100 will be explained with reference to FIG. 17. To simplify the explanation, it will be assumed that the digital input data 50 inputted to the gradation control unit 100 always takes a constant value, and that this value is ⅔ (=170) of the full data (=255).

First of all, the digital image data 50 is inputted from outside to the gradation control unit 100 in synchronism with a ½ frequency division signal of the horizontal sync signal 49. At this time, the screen control unit 56 outputs a signal representing which of the gradation correction tables d to f of the gradation correction unit 57 is to be selected, and the letters in FIG. 17 represent the selected gradation correction table. In other words, symbol d represents that the gradation correction table d is selected, and similarly, e and f represent that the gradation correction tables e and f are selected, respectively. In this way, the gradation correction tables d to f are periodically selected in synchronism with the horizontal sync signal, which is ½ times the transmission period of the digital image data 50.

As is obvious from FIG. 8, a value equal to the value of the digital image data 50 is outputted from the gradation correction unit 57 while the gradation correction tables d and e are selected, and 0 is outputted from the gradation correction unit 57 while the gradation correction table f is selected. The triangular wave (1) formation unit 59 forms a triangular wave by the use of the output of the frequency divider 58 and the triangular wave (2) formation unit 60 forms a triangular wave by reversing the output of the frequency divider 58. Accordingly, the phases of these two triangular waves deviate by 180° from each other.

The output of the select signal generation unit 101 is periodically toggled at a ½ pixel period. Receiving the output of the select signal generation unit 101, the analog switch 86 alternately selects the output of the triangular wave (1) formation unit 59 and the output of the triangular wave (2) formation unit 60. Here, if the analog switch 86 is so set as to select the output of the triangular wave (1) formation unit 59 when the output of the select signal generation unit 101 is at a Hi level and to select the output of the triangular wave (2) formation unit 60 when the output of the select signal generation unit 55 is at Low level, the output from the analog switch 86 describes a particular "N"-like shape as shown in FIG. 17.

On the other hand, the output of the gradation correction unit 57 is converted to an analog level signal by the D/A convector 61. The comparator 87 compares the output from the D/A convertor 61 with the output from the analog switch 86. The comparator 87 outputs a Hi level signal, when the output from the D/A convertor 61 exceeds the output of the analog switch 86, and outputs a Low level signal at other times. In this way, the output of the comparator 87 shown in FIG. 17 can be obtained.

In the second embodiment of the present invention, the value of the digital image data 50 has been assumed to be always equal so as to simplify the explanation. However, it can be understood from the explanation given above that when the value of the digital image data 50 becomes great, the pulse width of the output of the comparator 87 becomes great, and when the value of the digital image data 50 becomes small, on the contrary, the pulse width of the output from the comparator 87 becomes small, so that pulse width modulation can be carried out in accordance with the value of the digital image data 50. The output of the comparator 87 is used as the ON/OFF control signal of the laser. When the output of the comparator is Hi, the laser is turned ON and when the output is Low, the laser is turned OFF. In this second embodiment, too, the characterizing features of the gradation correction tables and the method of forming the screen angle are the same as those in the first embodiment. Incidentally, the number of comparators in this second embodiment is smaller than in the first embodiment and hence, the construction is much more simplified.

(Embodiment 3)

Next, the third embodiment of the present invention will be explained.

Figure 18:
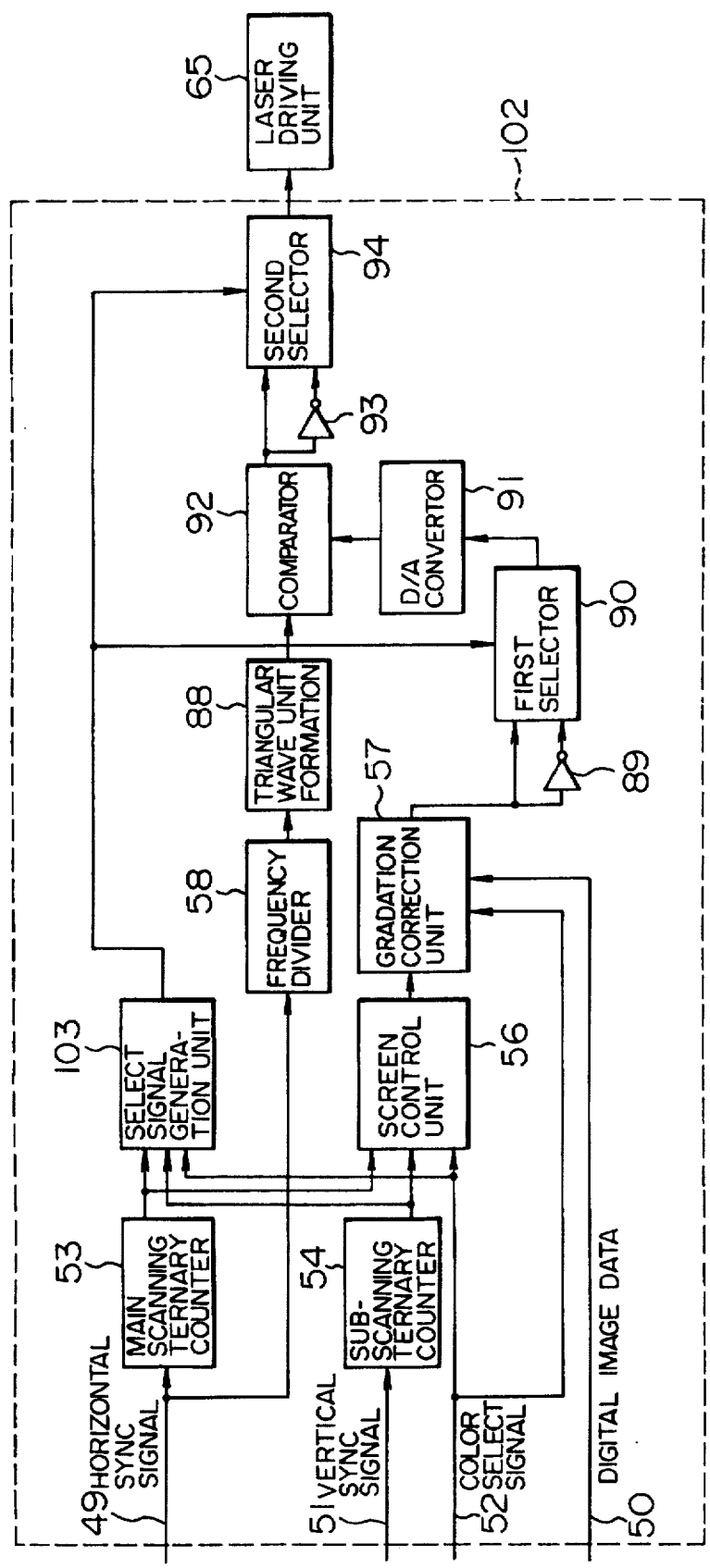
FIG. 18 is a block diagram of the gradation control unit of the image formation apparatus according to the third embodiment of the present invention.

FIG. 18 is a block diagram of the gradation control unit of the image formation apparatus according to the third embodiment of the present invention. In FIG. 18, reference numeral 102 denotes the gradation control unit of an image formation apparatus. Explanations of those signals and those constituents in the gradation control unit 102 which are the same as those of the first embodiment will be omitted. Reference numeral 103 denotes a select signal generation unit, which outputs select signals for first and second selectors 90, 94 from the signals of the main scanning ternary counter 53, the sub-scanning ternary counter 54 and the color select signal 52. Reference numeral 88 denotes the triangular wave formation unit, which converts the output of the frequency divider 58 to an analog pattern signal using an integration circuit. Reference numeral 89 denotes a first invertor, which inverts the digital image data after gradation correction, which is outputted from the gradation correction unit 57. Since this digital image data has eight bits, the first invertor 89 is so constituted as to correspond to these eight bits. Reference numeral 90 denotes the first selector, which selects either one of the non-inverted data and inverted data from the output of the gradation correction unit 57. Reference numeral 91 denotes a D/A convertor, which converts the output of the first selector 90 to an analog level signal. Reference numeral 92 denotes a comparator, which compares the output of the triangular wave formation unit 88 with that of the D/A convertor 91, and converts the output of D/A convertor 91 to the pulse widths. Reference numeral 93 denotes a second invertor, which inverts the output of the comparator 92. Since the pulse output from the DA convertor 91 is a binary signal, the second invertor 93 may have one bit. Reference numeral 94 denotes the second selector, which selects either one of non-inverted data and inverted data from the output of the comparator 92. In this third embodiment, the explanation will be presented on the premise that the gradation correction tables d to f shown in FIG. 8 are used.

Figure 19:
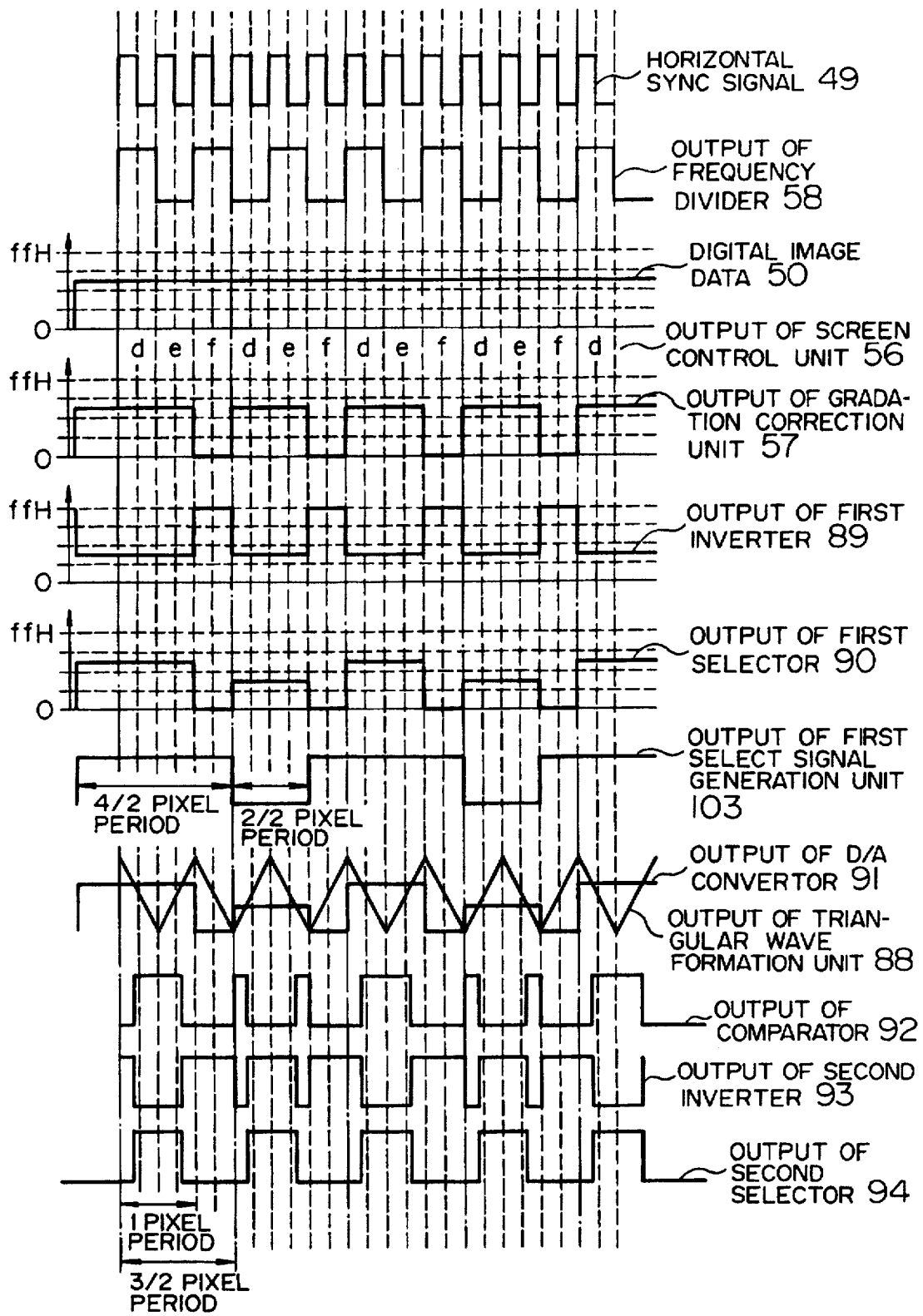
FIG. 19 shows the operation of the gradation control unit of the image formation apparatus according to the third embodiment.

Next, the operation of the gradation control unit 102 will be explained with reference to FIG. 19. To simplify the following explanation, it will be assumed hereby that the digital image data 50 inputted to the gradation control unit 102 always takes a constant value, and that this value is ⅔ (=170) of the full data (=255).

First of all, the digital image data 50 is inputted from outside to the gradation control unit 102 in synchronism with a ½ frequency division signal of the horizontal sync signal. At this time, the screen control unit 56 outputs a signal representing which of the gradation correction tables d to f of the gradation correction unit 57 is to be selected, and the letters shown in FIG. 19 represent the selected gradation correction table. For example, d represents that the gradation correction table d is selected and similarly, e and f represent that the gradation correction tables e and f are selected, respectively. In this way, the gradation correction tables d to f are periodically selected in synchronism with the horizontal sync signal, which is ½ times the transmission period of the digital image data 50.

Here, as is obvious from FIG. 8, the gradation correction unit 57 outputs a value equal to the digital image data 50 while the gradation correction tables d and e are selected, and outputs 0 when the gradation control table f is selected. The output of the gradation correction unit 57 is divided into two systems. One of them is inputted as "through" (non-inverted) while the other is outputted after the full bits are inverted by the first invertor 89.

Next, the output of the select signal generation unit 103 will be explained. The select signal generation unit 103 outputs a Hi level for a ⅔ pixel period (during a period in which the horizontal sync signal 49 is inputted four times), outputs a Low level for the next ⅔ pixel period (during a period in which the horizontal sync signal 49 is inputted twice), and thereafter repeats the sequence described above. Each of the first and second selectors 90, 94 select one of the signals from the two systems of the input signals in accordance with the output of the select signal generation unit 103, and each of them is so set as to select the non-inverted output when the output of the select signal generation unit 103 is at a Hi level and to select the inverted output when the output of the select signal generation unit 103 is at a Low level. Accordingly, the output of the first selector 90 shifts as shown in FIG. 19. The output of the first selector 90 is converted to an analog level signal by the D/A convertor 91 and is then compared with the output of the triangular wave formation unit 88 by the comparator 92. The comparator 92 outputs a Hi level signal when the output from the D/A convertor 91 exceeds the output of the triangular wave formation unit 88, and outputs a Low level signal at other times. In this way, the output of the comparator 93 shown in FIG. 19 can be obtained. The output of the comparator 92 is divided into two systems. One of them is outputted as "through" (non-inverted) while the other is outputted after bit reversal by the second invertor 93. Among the outputs divided into the two systems, the non-inverted output is selected by the second selector 94 when the output of the select signal generation unit 103 is at a Hi level, and the inverted output is selected when the output of the select signal generation unit 103 is at a Low level. In this way, the output of the second selector 94 becomes such as shown in FIG. 19.

To simplify the explanation, the third embodiment of the present invention has been explained on the premise that the value of the digital image data 50 remains always equal. However, it can be said that when the value of the digital image data 50 becomes great, the pulse width of the output from the second selector 94 becomes great, and when the value of the digital image data 50 becomes small, on the contrary, the pulse width of the output from the second selector 94 becomes small, so that pulse width modulation is carried out in accordance with the value of the digital image data 50. The output from the second selector 94 is used as the ON/OFF control of the laser by the laser driving unit 65. In other words, the laser is turned ON when the output of the second selector 94 is Hi and is turned OFF when the latter is Low. In the third embodiment of the present invention, too, the characterizing features of the gradation correction tables and the method of forming the screen angle remain the same as those of the first embodiment. Incidentally, the third embodiment provides the advantage that only one triangular wave formation unit 88 is needed, a number that is smaller than in the first and second embodiments and hence, the number of portions to be adjusted becomes smaller, as well.

Next, a double resolution output mode will be explained. This double resolution output mode can obtain an image output having double resolution in the main scanning direction without changing at all the construction of an image formation apparatus according to the first and second embodiments of the present invention that have already been described.

Figure 20:
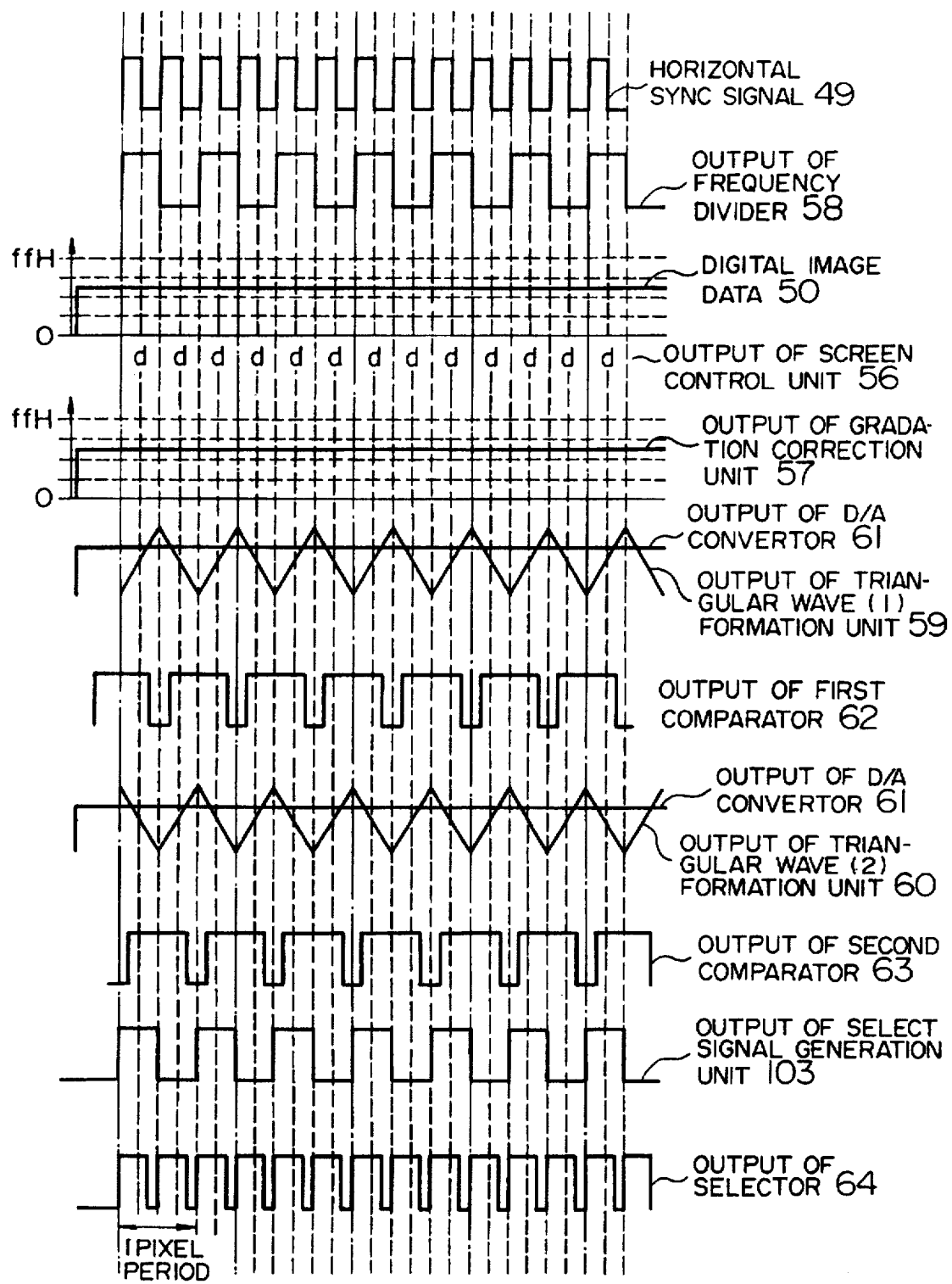
FIG. 20 shows the operation of the gradation control unit in a double resolution output mode in the image formation apparatus according to an embodiment of the present invention.
Figure 21:
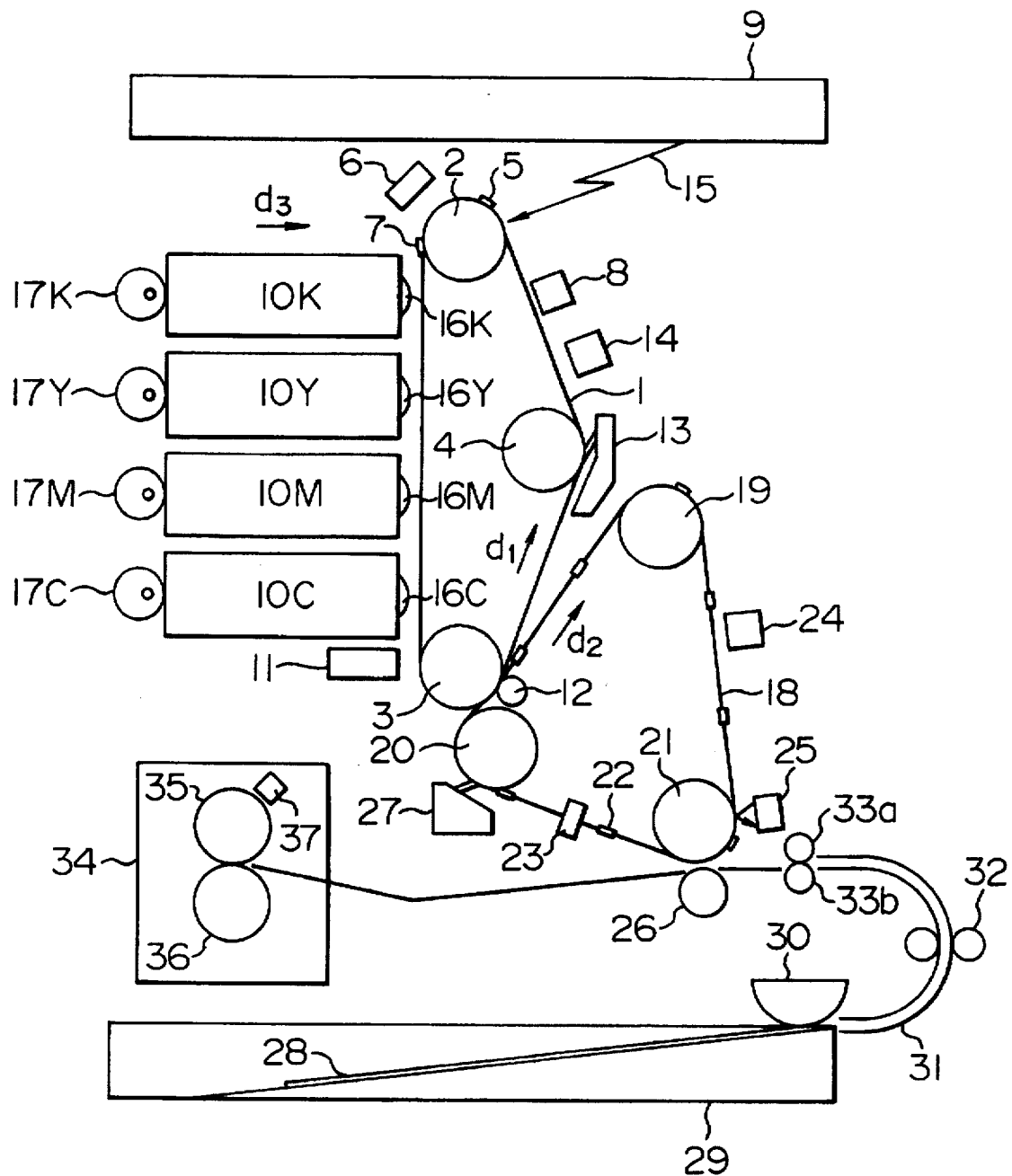
FIG. 21 shows the construction of an image formation apparatus according to the prior art.

Hereinafter, the operation of the gradation control unit in the double resolution output mode will be explained with reference to FIG. 1, which is a block diagram of an image formation apparatus according to the first embodiment, and to FIG. 20.

To simplify the explanation, it will be assumed hereby that the digital image data 50 inputted to the gradation control unit 48 always takes a constant value and that this value is ⅔ (=170) of the full data (=255).

First of all, the digital image data 50 is inputted from outside to the gradation control unit 48 in synchronism with the horizontal sync signal 49. In order to have resolution double in the same line length, the data quantity of one line is double that of each embodiment described above. It will be further assumed that the output from the screen control unit 56 is fixed, and the gradation correction table d shown in FIG. 8A is always selected in this embodiment. This gradation correction table d is the one that outputs a value equal to the input, but a gradation conversion table for exclusive use for characters, line drawings, etc., may be provided in place of this gradation correction table d.

As described above, the output from the screen control unit 56 is fixed, and the gradation correction table d is a non-conversion table. Therefore, the output from the gradation correction unit 57 is exactly the same as the digital image data 50. The output from the gradation correction unit 57 is converted to an analog level signal by the D/A convertor 61. The first comparator 62 compares the output of the D/A convertor 61 with the output of the triangular wave (1) formation unit 59. When the output of the D/A convertor 61 exceeds the output of a triangular wave (1) formation unit, the High level signal is outputted, and a Low level signal is outputted at other times. In this way, the output of the first comparator 62 shown in FIG. 20 can be obtained.

On the other hand, the second comparator 63 compares the output of the D/A convertor 61 with the output of the triangular wave (2) formation unit 60, outputs a Hi level signal when the output of the D/A convertor 61 exceeds the output of the triangular wave (2) formation unit 60, and outputs a Low level signal at other times. In this way, the output of the second comparator 63 shown in FIG. 20 can be obtained.

The output of the select signal generation unit 55 is periodically toggled at a ½ pixel period. Receiving the output of the select signal generation unit 55, the selector 64 alternately selects the output of the first comparator 62 and the output of the second comparator 63. Here, when the selector 64 is so set as to select the output of the first comparator 62 when the output of the select signal generation unit 55 is at a Hi level and to select the output of the second comparator 63 when the output of the select signal generation unit 55 is at a Low level, the output of the selector 64 becomes such as shown in. FIG. 20, and a pulse width modulation output can be obtained with a ½ pixel period.

To simplify the explanation, this embodiment has been explained on the assumption that the value of the digital image data 50 is always equal. However, it can be said that when the value of the digital image data 50 becomes great, the pulse width of the output of the selector 64 becomes great, and when the value of the digital image data 50 becomes small, on the contrary, the pulse width of the output of the selector 64 becomes small, so that pulse width modulation can be carried out in accordance with the value of the digital image data 50. The output of this selector 64 is used as the ON/OFF control signal of the laser by the laser driving unit 65. In other words, the laser is turned ON when the output of the selector 64 is Hi and is turned OFF when the latter is Low.

As described above, the dot formation period in the double resolution mode is ½ times the one pixel period explained in "Description of the Related Art". Accordingly, resolution becomes twice the standard resolution.

Figure 22:
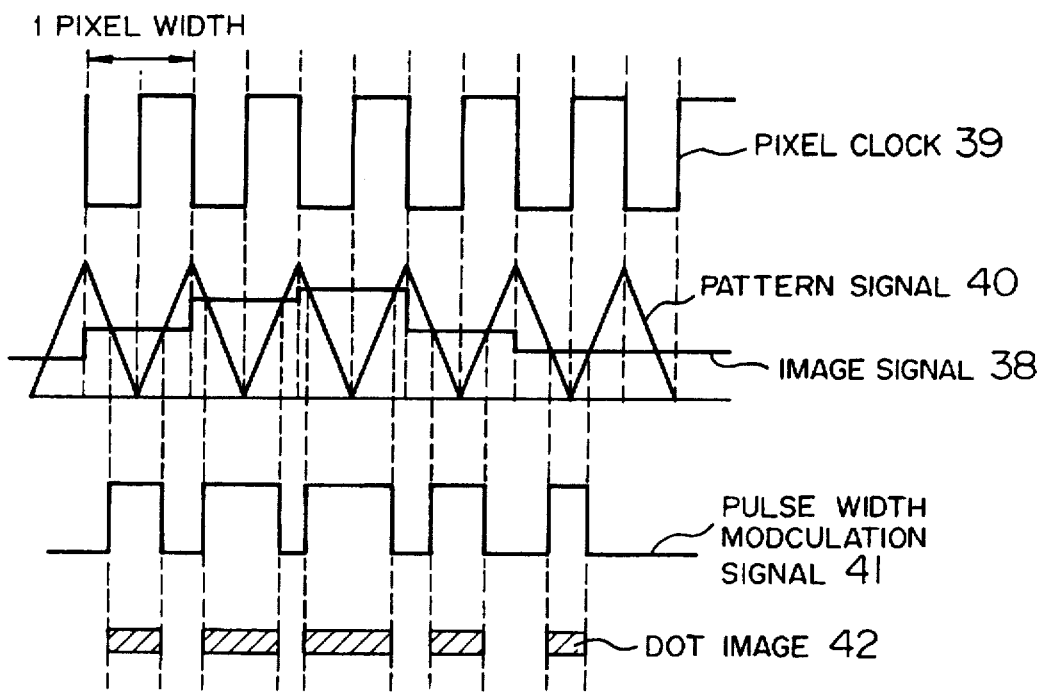
FIG. 22 is a conceptual view of a gradation reproduction method in the image formation apparatus according to the prior art.
Figure 23:
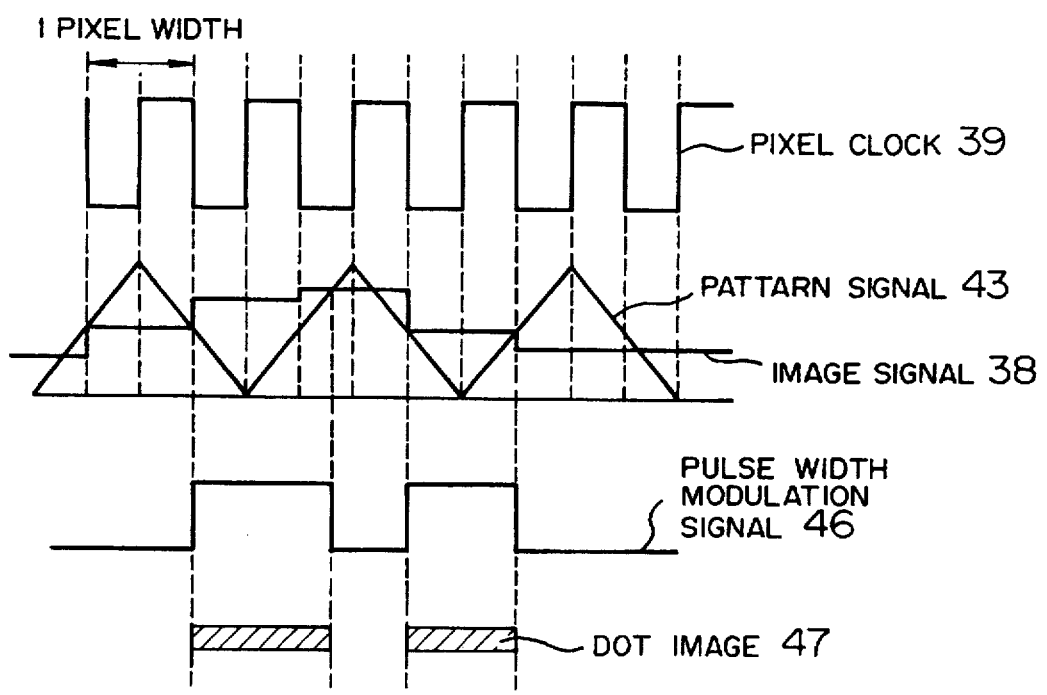
FIG. 23 is a conceptual view when importance is attached to the gradation characteristics in the image formation apparatus according to the prior art.

By the way, an image formation apparatus described above can form the dots in one pixel period in the same way as the pulse width modulation explained in the "Description of the Related Art" with reference to FIG. 22 by transmitting the digital image data 50 in synchronism with the ½ frequency division signal of the horizontal sync signal in the construction shown in FIG. 1, for example, fixing the output of the screen control unit 56 to the gradation correction table d shown in FIG. 8A, for example, fixing further the output of the select signal generation portion 55 at a Hi level and carrying out pulse width modulation.

The image formation apparatuses according to the first and second embodiments of the present invention can obtain first resolution for obtaining an image in synchronism with the one pixel period explained in the "Description of the Related Art", second resolution for obtaining an image in synchronism with ½ of the one pixel period and third resolution for obtaining an image in synchronism with ½ of the one pixel period, without changing the construction of the apparatuses, by merely using selectively the triangular wave (1) formation unit 59 and the triangular wave (2) formation unit 60.

As described above, an image formation apparatus according to the present invention includes a memory unit for storing a plurality of input image level-print output level characteristics for applying gradation correction to the inputted image data, and a gradation correction unit for selecting different input image-print output level characteristics from the memory unit in each ½ period of the transmission period of the input image data when n is a natural number of 2 or more, and determining the print output level of the dots in accordance with the level of the inputted image data on the basis of the selected characteristics. Accordingly, the apparatus of the present invention can finely set the maximum value of the size of the dots, that is, resolution, from the number of the selected input image level-print output levels and from the selection period, and can obtain an images having gradation and resolution in good balance.

What is claimed is:

1. An image formation apparatus for conducting gradation recording by changing the size of dots on the basis of inputted image data, comprising:
    memory means for storing a plurality of input image level-print output level characteristics for effecting gradation correction to the inputted image data; and
    gradation correction means for selecting different input image level-print output level characteristics from said memory means in each 1/n period of a transmission period of the inputted image data when n represents a natural number of 2 or more, determining the print output level of said dots in accordance with the inputted image data on the basis of said selected characteristics and determining the size of said dots to be printed in accordance with said determined print output level,
    wherein one of said plurality of said input image level-print output level characteristics stored in said memory means has only two possible values for the print output level.

2. An image formation apparatus for conducting gradation recording by changing the size of dots on the basis of inputted image data, comprising:
    memory means for storing a plurality of input image level-print output level characteristics for effecting gradation correction to the inputted image data;
    selection means for selecting different input image level-print output level characteristics from said memory means in each 1/n period of a transmission period of the inputted image data when n represents a natural number of 2 or more;
    gradation correction means for outputting a print output level of said dots in accordance with the level of the inputted data on the basis of the characteristics selected by said selection means;
    triangular wave formation means for outputting a triangular wave signal in synchronism with the transmission period of the inputted image data; and
    comparison means for comparing the print output level signal outputted from said gradation correction means with the triangular wave signal outputted from said triangular wave formation means, and outputting a signal having a predetermined level in accordance with the comparison result.

3. An image formation apparatus according to claim 2, wherein one of said plurality of said input image level-print output level characteristics stored in said memory means has only two possible values for the print output level.

4. An image formation apparatus for conducting gradation recording by changing the size of dots on the basis of inputted image data, comprising:
    memory means for storing a plurality of input image level-print output level characteristics for effecting gradation correction to the inputted image data;

selection means for selecting different input image level-print output level characteristics from said memory means in each half period of a transmission period of the inputted image data;

gradation correction means for outputting a print output level of said dots in accordance with the level of the inputted image data on the basis of the characteristics selected by said selection means;

first and second triangular wave formation means for outputting triangular wave signals having mutually different phases but having the same period as the transmission period of the inputted image data;

first comparison means for comparing a print output level signal outputted from said gradation correction means with the triangular wave signal outputted from said first triangular wave formation means, and outputting a signal having a predetermined level in accordance with the comparison result;

second comparison means for comparing the print output level signal outputted from said gradation correction means with the triangular wave signal outputted from said second triangular wave formation means, and outputting a signal having a predetermined level in accordance with the comparison result; and switching means for alternately switching the signals outputted from said first and second comparison means in each m/2 period of the transmission period of the inputted image data when m is a natural number.

5. An image formation apparatus according to claim 4, wherein a switch period of said switching means is a ½ period of the transmission period of an image data.

6. An image formation apparatus according to claim 4, wherein one of said plurality of said input image level-print output level characteristics stored in said memory means has only two possible values for the print output level.

7. An image formation apparatus according to claim 4, wherein said selection means always selects the same input image level-print output level characteristics from said memory means, and the switch period of said switching means is a ½ period of the transmission period of an image data.

8. An image formation apparatus for conducting gradation recording by changing the size of dots on the basis of inputted image data, comprising:

memory means for storing a plurality of input image level-print output level characteristics for effecting gradation correction to the inputted image data;

selection means for selecting different input image level-print output level characteristics from said memory means in each half period of a transmission period of the inputted image data;

gradation correction means for outputting a print output level of said dots in accordance with the level of the inputted image data on the basis of the characteristics selected by said selection means;

first and second triangular wave formation means for outputting triangular wave signals having mutually different phases but having the same period as the transmission period of the inputted image data;

switching means for alternately switching the triangular wave signals outputted from said first and second triangular wave formation means, in each m/2 period of the transmission period of the inputted image data when m is a natural number; and comparison means for comparing the print output level signal outputted from said gradation correction means with the triangular wave signal outputted from said switching means, and outputting a signal having a predetermined level in accordance with the comparison result.

9. An image formation apparatus according to claim 8, wherein the switching period of said switching means is a ½ period of the transmission period of an image data.

10. An image formation apparatus according to claim 8, wherein one of said plurality of input image level-print output level characteristics stored in said memory means has only two possible values for the print output level.

11. An image formation apparatus according to claim 8, wherein said selection means always selects the same input image level-print output level characteristics from said memory means, and the switching period of said switching means is a ½ period of the transmission period of an image data.

12. An image formation apparatus for conducting gradation recording by changing the size of dots on the basis of inputted image data, comprising:

memory means for storing a plurality of input image level-print output level characteristics for effecting gradation correction to inputted image data;

selection means for sequentially selecting different input image level-print output level characteristics from said memory means in each 1/n period of a transmission period of the inputted image data when n is a natural number of 2 or more, and changing the selection sequence for each raster line of the inputted image data; and gradation correction means for determining the print output level of the dots in accordance with the level of the inputted image data on the basis of the characteristics selected by said selection means and determining the size of the dots to be printed, in accordance with the determined print output level.

13. An image formation apparatus according to claim 12, wherein the selection means sequentially selects the different input image level-print output level characteristics in sequences that are predetermined.

14. An image formation apparatus according to claim 13, wherein each predetermined sequence remains unchanged for all of the dots on a raster line.

15. An image formation apparatus according to claim 12, wherein the transmission periods of the inputted image data have a common duration and the inputted image data during each transmission period has a constant input image level for that transmission period.

16. An image formation apparatus for conducting gradation recording by changing the size of dots on the basis of inputted image data, comprising:

means for providing a plurality of input image level-print output level characteristics, including first input image level-print output level characteristics for effecting gradation correction to the inputted image data and second input image level-print output level characteristics having only two possible values for the print output level; and means for selecting different input image level-print output level characteristics from said means for providing in each 1/n period of a transmission period of the inputted image data when n represents a natural number of 2 or more, determining the print output level of said dots in accordance with the inputted image data on the basis of said selected characteristics, and determining the size of said dots to be printed in accordance with said output level.

17. An image formation apparatus according to claim 16, wherein the two possible values for the print output level in the second input image level-print output level characteristics are a predetermined minimum value and a predetermined maximum value.

18. An image formation apparatus according to claim 17, wherein said plurality of input image level-print output level characteristics additionally includes third input image level-print output level characteristics for effecting gradation correction to the inputted image data.

19. An image formation apparatus according to claim 18, wherein the first input image level-print output level characteristics are such that the print output level has the predetermined minimum value for a predetermined range of input image levels.

20. An image formation apparatus according to claim 18, wherein the first input image level-print output level characteristics are such that the print output level has the predetermined maximum value for a predetermined range of input image levels.

21. An image formation apparatus according to claim 16, wherein said plurality of input image level-print output level characteristics additionally includes third input image level-print output level characteristics for effecting gradation correction to the inputted image data.

22. An input formation apparatus according to claim 16, wherein the means for providing comprises a look-up memory.

23. An image formation apparatus for conducting gradation recording by changing the size of dots on the basis of inputted image data, comprising:

memory means for storing a plurality of input image level-print output level characteristics for effecting gradation correction to the inputted image data; and gradation correction means for selecting different input image level-print output level characteristics from said memory means in each 1/n period of a transmission period of the inputted image data when n represents a natural number of 2 or more, determining the print output level of said dots in accordance with the inputted image data on the basis of said selected characteristics and determining the size of said dots to be printed in accordance with said determined print output level, wherein the gradation correction means selects the different input image level-print output level characteristics in a predetermined sequence.

24. An image formation apparatus according to claim 23, wherein the predetermined sequence remains unchanged for all of the dots on a raster line.

25. An image formation apparatus for conducting gradation recording by changing the size of dots on the basis of inputted image data, comprising:

memory means for storing a plurality of input image level-print output level characteristics for effecting gradation correction to the inputted image data; and gradation correction means for selecting different input image level-print output level characteristics from said memory means in each 1/n period of a transmission period of the inputted image data when n represents a natural number of 2 or more, determining the print output level of said dots in accordance with the inputted image data on the basis of said selected characteristics and determining the size of said dots to be printed in accordance with said determined print output level, wherein the transmission periods of the inputted image data have a common duration and the inputted image data during each transmission period has a constant input image level for that transmission period.

* * * * *